US012572960B2

(12) United States Patent
O'Sullivan et al.

(10) Patent No.: US 12,572,960 B2
(45) Date of Patent: Mar. 10, 2026

(54) SYSTEMS AND METHODS FOR PROVIDING IN-FLIGHT COMMUNICATION SESSIONS

(71) Applicant: Viasat Inc., Carlsbad, CA (US)

(72) Inventors: Niall O'Sullivan, Dundrum (IE); Fergal Murray, Tomhaggard (IE); Ultan O'Brien, Carrickmines (IE)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 18/899,298

(22) Filed: Sep. 27, 2024

(65) Prior Publication Data

US 2025/0166017 A1     May 22, 2025

Related U.S. Application Data

(63) Continuation of application No. 18/473,828, filed on Sep. 25, 2023, now Pat. No. 12,112,353, which is a continuation of application No. 17/912,027, filed as application No. PCT/US2020/023401 on Mar. 18, 2020, now Pat. No. 11,803,877.

(51) Int. Cl.
| | |
|---|---|
| *G06Q 30/02* | (2023.01) |
| *G06Q 30/0251* | (2023.01) |
| *H04L 67/12* | (2022.01) |
| *H04W 4/42* | (2018.01) |

(52) U.S. Cl.
CPC ......... *G06Q 30/0269* (2013.01); *H04L 67/12* (2013.01); *H04W 4/42* (2018.02)

(58) Field of Classification Search
CPC ...... G06Q 30/0269; H04W 4/42; H04L 67/12
See application file for complete search history.

(56) References Cited

U.S. PATENT DOCUMENTS

| | | | |
|---|---|---|---|
| 8,027,873 | B2 | 9/2011 | Drefs et al. |
| 9,220,985 | B1 | 12/2015 | Auterio et al. |
| 9,900,082 | B1 | 2/2018 | Chowdhury et al. |

(Continued)

FOREIGN PATENT DOCUMENTS

| | | |
|---|---|---|
| CN | 101687549 A | 3/2010 |
| CN | 110088819 A | 8/2019 |

(Continued)

OTHER PUBLICATIONS

International Search Report & Written Opinion dated Nov. 13, 2020, PCT/US2020/023401, 9 pages.

*Primary Examiner* — Scott C Anderson
(74) *Attorney, Agent, or Firm* — Holland & Hart LLP

(57) ABSTRACT

Methods, systems, and devices for providing in-flight communication sessions. In some examples, a communication session delivery system may provide network access service or other types of content once a passenger has completed a brand interaction. The brand interaction may be any number of options that a brand partner may require in exchange for access to content. The communication session delivery system may choose from a plurality of reward offers and then display the chosen offers to a passenger. The chosen offers may be selected based on profile information of a passenger and characteristics targeted by a brand partner. The passenger may then choose an offer and perform the required brand interaction. Once the brand interaction has been verified, the passenger may receive the reward associated with the offer.

20 Claims, 10 Drawing Sheets

(56)           References Cited

U.S. PATENT DOCUMENTS

| | | |
|---|---|---|
| 11,263,653 B1 | 3/2022 | Sumien et al. |
| 2009/0055271 A1 | 2/2009 | Drefs et al. |
| 2011/0134487 A1 | 6/2011 | Seto |
| 2011/0313826 A1 | 12/2011 | Keen et al. |
| 2011/0314488 A1 | 12/2011 | Keen et al. |
| 2013/0173371 A1 | 7/2013 | Krokick |
| 2013/0238417 A1 | 9/2013 | Frelk, Jr. |
| 2013/0339111 A1 | 12/2013 | Ross et al. |
| 2014/0282684 A1 | 9/2014 | Keen et al. |
| 2014/0282727 A1 | 9/2014 | Keen et al. |
| 2015/0350457 A1 | 12/2015 | Lauer |
| 2016/0232558 A1 | 8/2016 | Postrel |
| 2017/0132688 A1 | 5/2017 | Freund et al. |
| 2017/0206562 A1* | 7/2017 | Mowry ............. G06Q 30/0255 |
| 2018/0060904 A1 | 3/2018 | Hunt et al. |
| 2018/0137535 A1* | 5/2018 | Koenig .................. A63F 13/61 |
| 2018/0204237 A1 | 7/2018 | Jafri |
| 2018/0207533 A1 | 7/2018 | Anderson et al. |
| 2019/0037372 A1 | 1/2019 | Girard et al. |
| 2019/0244265 A1 | 8/2019 | Van Sant et al. |
| 2020/0082402 A1* | 3/2020 | Patel .................... G06Q 20/405 |
| 2020/0334703 A1 | 10/2020 | Chang |
| 2021/0031471 A1 | 2/2021 | Newman |
| 2022/0005069 A1 | 1/2022 | Seidl et al. |

FOREIGN PATENT DOCUMENTS

| | | |
|---|---|---|
| EP | 2211500 A1 | 7/2010 |
| EP | 3530569 A1 | 8/2019 |
| JP | 2011504644 A | 2/2011 |
| JP | 2012044375 A | 3/2012 |
| JP | 2002056161 A | 2/2022 |
| WO | 2014054612 A1 | 8/2016 |
| WO | 2023044051 A1 | 3/2023 |
| WO | 2023044058 A1 | 3/2023 |

* cited by examiner

100

105

145

130

160

155

135

140

110

165

170

Multi-user Access Terminal

Communication Session Delivery System 125-b

176

180-b   175-b 180-n   175-n

115

Gateway

Communication Session Delivery System 125-a

Network

120

180-a   175-a

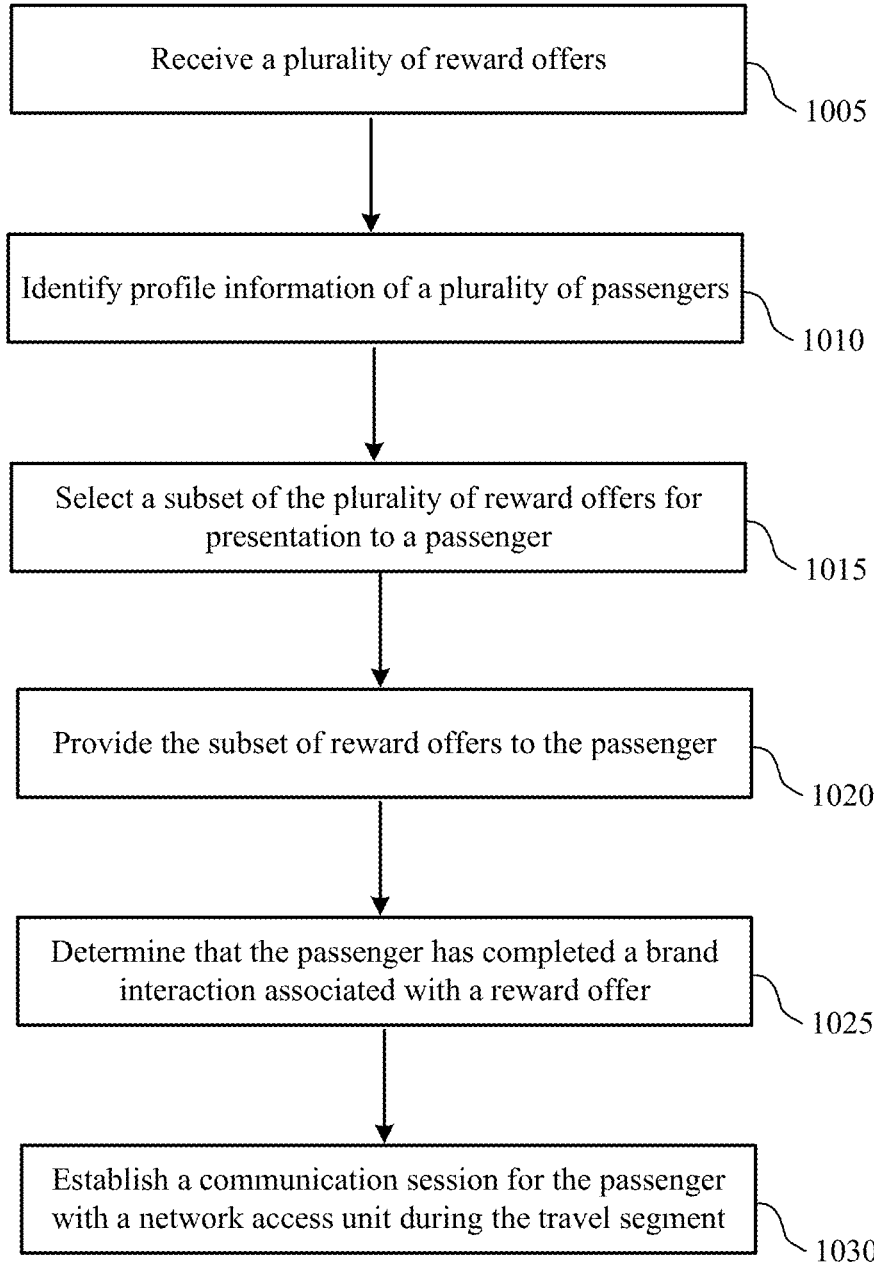

Receive a plurality of reward offers

1005

Identify profile information of a plurality of passengers

1010

Select a subset of the plurality of reward offers for presentation to a passenger

1015

Provide the subset of reward offers to the passenger

1020

Determine that the passenger has completed a brand interaction associated with a reward offer

1025

Establish a communication session for the passenger with a network access unit during the travel segment

SYSTEMS AND METHODS FOR PROVIDING IN-FLIGHT COMMUNICATION SESSIONS

CROSS REFERENCE

The present application for patent is a Continuation of U.S. patent application Ser. No. 18/473,828 by O'Sullivan et al., entitled, "SYSTEMS AND METHODS FOR PROVIDING IN-FLIGHT COMMUNICATION SESSIONS" filed Sep. 25, 2023, which is a Continuation of U.S. patent application Ser. No. 17/912,027 by O'Sullivan et al., entitled "Systems and Methods For Providing In-Flight Communication Sessions" filed Sep. 15, 2022, which is a 371 International Phase application of PCT/US2020/023401 by O'Sullivan et al., entitled "Systems and Methods For Providing In-Flight Communication Sessions" filed Mar. 18, 2020, each of which are assigned to the assignee hereof, and expressly incorporated by reference in its entirety herein.

BACKGROUND

The following relates generally to communication session delivery systems, and more specifically to techniques for providing in-flight communication sessions.

Increasingly, passengers on commercial aircraft or other transit vehicles such as buses, trains, boats, and the like, desire broadband network access while in transit. Additionally, passenger vehicles often include vehicle information systems to satisfy the desire of the passenger to access viewing content, such as entertainment, information content or other viewing content, while on the move. Passenger aircraft may receive network access service via a shared communication link such as a satellite communication link. The aircraft may have an on-board multi-user access terminal that communicates with ground stations (e.g., via a satellite of a satellite communication system) and provides network access connectivity for the passengers. For example, users may connect their communication devices (e.g., smartphones, laptops, tablets, etc.) to a wireless local area network (WLAN) served by the multi-user access terminal, which routes data communications to other networks (e.g., the Internet) via the shared communication link.

As passenger demand for broadband access and viewing content continues to evolve, operators of communication session delivery systems have devised various techniques to monetize the services in order to provide passengers reliable and pleasing experiences. However, different monetization techniques may lead to varying levels of satisfaction for the passenger. For example, separately charging passengers for access to communication sessions may lead to passenger frustration because they may feel as though the operator of the passenger vehicle is charging them for every additional service option during a trip. In view of the above, there is a need for improved communication session delivery systems associated with passenger vehicles to overcome the shortcomings of conventional communication session delivery systems.

SUMMARY

The described techniques relate to improved methods, systems, devices, and apparatuses that support techniques for providing in-flight communication sessions. In some examples, a communication session delivery system may provide network access service or other types of content once a passenger has completed a brand interaction. The brand interaction may be any number of options that a brand partner may require in exchange for access to content. The communication session delivery system may choose from a plurality of reward offers and then display the chosen offers to a passenger. The chosen offers may be selected based on profile information of a passenger and characteristics targeted by a brand partner. The passenger may then choose an offer and perform the required brand interaction. Once the brand interaction has been verified, the passenger may receive the reward associated with the offer.

BRIEF DESCRIPTION OF THE DRAWINGS

FIG. 10 shows a flowchart illustrating a method that supports techniques for offers for providing in-flight communication sessions in accordance with aspects of the present disclosure.

DETAILED DESCRIPTION

Figure 1:
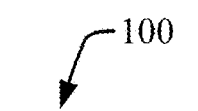
FIG. 1 illustrates an example of a system for wireless communications that supports techniques for providing in-flight communication sessions in accordance with aspects of the present disclosure.

A commercial passenger vehicle may support a shared communication link for network access service for passengers. For example, users may connect their communication devices to a wireless local area network (WLAN), which routes data communications to other networks (e.g., the Internet) via the shared communication link. The shared communication link may be a wireless link (e.g., cellular link, satellite communication link, etc.), and may be able to support wider bandwidth applications such as web browsing, multimedia streaming, or video communications.

Providing such network access and content services provides entertainment and comfort for a passenger during a travel segment, however, providing such services incurs costs to the travel provider. The travel provider may choose from a variety of monetization techniques in order to provide reliable and satisfactory communication session services to its passengers, including charging separate fees for chosen services, inserting ads, etc. However, charging separate fees may lead to passenger discontentment, and inserted ads have varying levels of efficacy in user engagement.

The described features relate to a communication session delivery system which delivers communication sessions to a passenger based on completed brand interactions chosen by the passenger. Completing brand interactions chosen by the passenger may improve the experience for both the passenger and a brand partner because the passenger may engage with an interaction that he or she is most interested in, and in turn, the brand partner will have a higher value interaction with the passenger than other methods, such as untargeted ads. Prior to a travel segment, brand partners or another entity may identify a number of reward offers to present to the passengers of a travel segment, where the reward offers may consist of a communication session in exchange for a passenger completing a brand interaction. A communication session delivery system may present a variety of selected reward offers to a passenger through a user interface such as a portal, application, etc. The passenger may access the user interface before and/or during the travel segment and may choose an offer that he or she is most interested in. The offer is associated with one or more characteristics of a communication session that can be provided to the passenger for using the shared communication link upon completing interaction with the offer. The characteristic(s) of the communication session can vary from offer to offer, and can be different in different embodiments. The characteristic(s) of the communication session may for example be one or more of a total amount of time allotted to the communication session, a data rate of the communication session, a total amount of data communicated during the communication session, access to one or more service types (e.g., text, email, streaming, etc.), access to one or more network destinations (e.g., a streaming video service provider, etc.), and combinations thereof. The type of interaction to be completed by the passenger can vary from offer to offer, and can be different in different embodiment. For example, the interaction may be creating a social media post about a particular brand associated with the offer. As another example, the example may be completing viewing of a video associated with the offer. Once the brand interaction has been verified, the communication session delivery system may provide the offered network access time to the passenger for use during the travel segment. The manner in which the communication session is provided to the passenger can vary from embodiment to embodiment. In some examples, the communication session may be attributed to a user account of the passenger managed by the communication session delivery system. In such a case, the passenger may choose when to use the communication session, such as on the current travel segment and/or on different travel segments (e.g., on the same or different airlines or other transportation providers). In other examples, the communication session may be attributed to the communication device used by the passenger without requiring the passenger create a user account.

Once a brand interaction has been verified, the communication session delivery system may record the successful interaction. The communication session delivery system may log multiple successful interactions to determine which interactions and offers users prefer. This information may be provided to brand partners in order to inform their reward offers, and travel providers may use the information to inform which reward offers they may present to passengers. Thus the experience for both passengers and brand partners may be continually improved upon.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 is a simplified diagram of a satellite communications system 100 in which the principles included herein may be described. The satellite communications system 100 may provide network access service to passengers 180 on board mobile vessel 130. It should be noted that although the network access service is illustrated as being provided by a satellite communication system and used as examples in the description that follows, other and/or additional types of communication systems (e.g., an air-to-ground communication system, etc.) may be used in other examples. The network access service may be provided to passengers 180 via a multi-user access terminal 170, to which passengers 180 may connect their communication devices 175 via wired (e.g., Ethernet) or wireless (e.g., WLAN) connections 176. Multi-user access terminal 170 may obtain the network access service via a user beam 145. It should be noted that although mobile vessel 130 is illustrated as an aircraft and aircraft are used as examples in the description that follows, references to aircraft may also be any type of mobile vessel transporting multiple passengers such as buses, trains, ships, etc.

Satellite communications system 100 may include any suitable type of satellite system, including a geostationary orbit (GEO), medium earth orbit (MEO), or low earth orbit (LEO) satellite system. Although only a single user beam 145 is illustrated, satellite 105 may be a multi-beam satellite, transmitting a number (e.g., typically 20-500, etc.) of user beams 145 each directed at a different region of the earth. This can allow coverage of a relatively large geographical area and frequency re-use within the covered area. Frequency re-use in multi-beam satellite systems permits an increase in capacity of the system for a given system bandwidth. With such a multi-beam satellite, there may be a number of different signal switching configurations, allowing signals from a single gateway system 115 to be switched between different spot beams. Alternatively, multiple gateways may transmit signals to satellite 105 for generating the multiple spot beams. Although illustrated as including one satellite 105, satellite communications system 100 may include multiple satellites. The multiple satellites may have service coverage areas that at least partially overlap with each other.

Each satellite user beam 145 of satellite 105 supports aircraft 130 within its coverage area (e.g., providing uplink and downlink resources). Frequency re-use between satellite user beams 145 may be provided by assigning one, or more, ranges of frequencies (which may be referred to as channels) to each satellite user beam 145 and/or by use of orthogonal polarizations. A particular frequency range and/or polarization may be called a "color," and frequency re-use in a tiled spot beam satellite system may be according to color. The coverage of different satellite user beams 145 may be non-overlapping or have varying measures of overlap. In some examples, satellite user beams 145 of satellite 105 may be tiled and partially overlapping to provide complete or almost complete coverage for a relatively large geographical area where partially overlapping or adjacent beams use different ranges of frequencies and/or polarizations (e.g., different colors).

Satellite communications system 100 includes a gateway system 115 and a network 120, which may be connected together via one or more wired or wireless links. Gateway system 115 is configured to communicate with one or more aircraft 130 via satellite 105. Network 120 may include any suitable public or private networks and may be connected to other communications networks (not shown) such as the Internet, telephony networks (e.g., Public Switched Telephone Network (PSTN), etc.), and the like. Network 120 may connect gateway system 115 with other gateway systems, which may also be in communication with satellite 105. Alternatively, a separate network linking gateways and other nodes may be employed to cooperatively service user traffic. Gateway system 115 may also be configured to receive return link signals from aircraft 130 (via the satellite 105) that are directed to a destination in network 120 or the other communication networks.

Gateway system 115 may be a device or system that provides an interface between network 120 and satellite 105. Gateway system 115 may use an antenna 110 to transmit signals to and receive signals from satellite 105 via a gateway uplink 135 and a gateway downlink 140. Antenna 110 may be two-way capable and designed with adequate transmit power and receive sensitivity to communicate reliably with satellite 105. In some examples, satellite 105 is configured to receive signals from antenna 110 within a specified frequency band and specific polarization.

In satellite communication system 100, passengers 180-*b* to 180-*n* may utilize network access service via mobile devices 175. Each passenger 180-*b* to 180-*n* may be provided service via satellite communication system 100 by connecting (e.g., via a wired or wireless connection) a mobile device 175 (e.g., desktop computer, laptop, set-top box, smartphone, tablet, Internet-enabled television, and the like) to the multi-user access terminal 170. As illustrated in FIG. 1, mobile devices 175-*b* to 175-*n* are connected via wired or wireless connections 176 (e.g., Wi-Fi, Ethernet, etc.) to multi-user access terminal 170. Multi-user access terminal 170 may receive data from satellite 105 via user beam downlink 155 and transmit data to satellite 105 via user beam uplink 160. While satellite communication system 100 is illustrated providing mobile network access service to passengers 180 aboard aircraft 130, it can be appreciated that the principles described herein for providing network access service to mobile users may be provided using multi-user access terminals positioned in fixed locations or on various modes of transportation where multiple mobile users may desire network access via satellite communications system 100 (e.g., trains, boats, buses, etc.).

Multi-user access terminal 170 may use an antenna 165 mounted on aircraft 130 to communicate signals with satellite 105 via a user beam downlink 155 and user beam uplink 160. Antenna 165 may be mounted to an elevation and azimuth gimbal which points antenna 165 (e.g., actively tracking) at satellite 105. Satellite communications system 100 may operate in the International Telecommunications Union (ITU) Ku, K, or Ka-bands (for example from 17.7 to 21.2 Giga-Hertz (GHz) in the downlink and 27.5 to 31 GHz in the uplink portion of the Ka-band). Alternatively, satellite communications system 100 may operate in other frequency bands such as C-band, X-band, S-band, L-band, and the like.

Satellite communications system 100 also includes a communication session delivery system 125. A component of communication session delivery system 125 (e.g., communication session delivery system 125-*a*) may be connected via one or more wired or wireless links to gateway 115 and/or network 120. Additionally or alternatively, there may be a component of communication session delivery system 125 (e.g., communication session delivery system 125-*b*) on-board aircraft 130. Although illustrated as being collocated with multi-user access terminal 170, communication session delivery system 125-*b* may be a separate component from multi-user access terminal 170. In that case, communication session delivery system 125-*b* may be connected via one or more wired or wireless links to multi-user access terminal 170.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, prior to and/or during a travel segment, a travel provider (e.g., airline, cruise line, railway line, bus line) or other entity may provide profile information of one or more passengers 180 of the travel segment to communication session delivery system 125. Additionally, the travel segment communication session delivery system 125 may identify a number of reward offers to present to passengers 180 of the travel segment, where the reward offers may include a communication session in exchange for a passenger 180 completing a brand interaction. The reward offers may be provided to communication session delivery system 125 by one or more brand partners. A portal (or other type of user interface) managed by (or otherwise in communication with) communication session delivery system 125 may then present a variety of selected reward offers to a passenger 180. Communication session delivery system 125 may select a subset of one or more reward offers based on, for example, the profile information of the one or more passengers 180 and/or on target characteristics specified by the brand partners. A passenger 180 may access the user interface before or during the travel segment and may choose an offer from the subset that he or she is most interested in.

For example, passenger 180-*a* may access the user interface prior to the travel segment using a mobile device 175-*a* and connecting to network 120 through a terrestrial access point. Upon being provided a subset of one or more selected offers on the user interface, passenger 180-*a* may select an offer good for a certain communication session in exchange for performing a brand interaction with the offer. Once the brand interaction has been verified, communication session delivery system 125-*a* may enable passenger 180-*a* to access a communication session when he or she is aboard aircraft 130. The manner in which the communication session delivery system 125-*a* enables the passenger to access the communication session can vary from embodiment to embodiment. In some examples, the communication session may be attributed to a user account of the passenger managed by the communication session delivery system. In such a case, the passenger may choose when to use the communication session, such as on the current travel segment and/or on different travel segments (e.g., on the same or different airlines or other transportation providers). In other examples, the communication session may be attributed to the communication device used by the passenger without requiring the passenger create a user account. The manner in which the communication session delivery system 125-*a* enables the passenger to use the communication session can vary from embodiment to embodiment. For example, the communication session delivery system 125-*a* may provide instructions to components of the satellite communications system 100 (e.g., multi-access user terminal 170, satellite 105, gateway 115, etc.) to provision access to network 120 to provide the communication session to a communication device associated with the passenger. Passengers 180-*b* through 180-*n* on board aircraft 130 may access the user interface prior to or during the travel segment via multi-user access terminal 170. The portal may be managed by communication session delivery system 125-*b* on board aircraft 130 or by communication session delivery system 125-*a* outside aircraft 130. Upon viewing of selected offers, passengers 180-*b* through 180-*n* may select an offer good for a certain communication session in exchange for performing a brand interaction. Once the brand interaction has been verified, communication session delivery system 125 may enable a respective passenger 180 to access the communication session during the travel segment. For example, communication session delivery system 125-*b* may maintain a list (e.g., white list) of devices that may be allowed to communicate to other devices or networks connected to network 120 (e.g., the Internet) and the associated durations of the communication sessions. Multi-user access terminal 170 may query the list to filter traffic coming from or going to the mobile devices. For example, multi-user access terminal 170 may maintain a network address translation table, and only devices on the list may be provided network address translation for access to networks outside of aircraft 130. Communication session delivery system 125-*b* may indicate to communication session delivery system 125-*b* the identifiers (e.g., MAC addresses) of mobile devices 175 which have been granted communication sessions.

Figure 2:
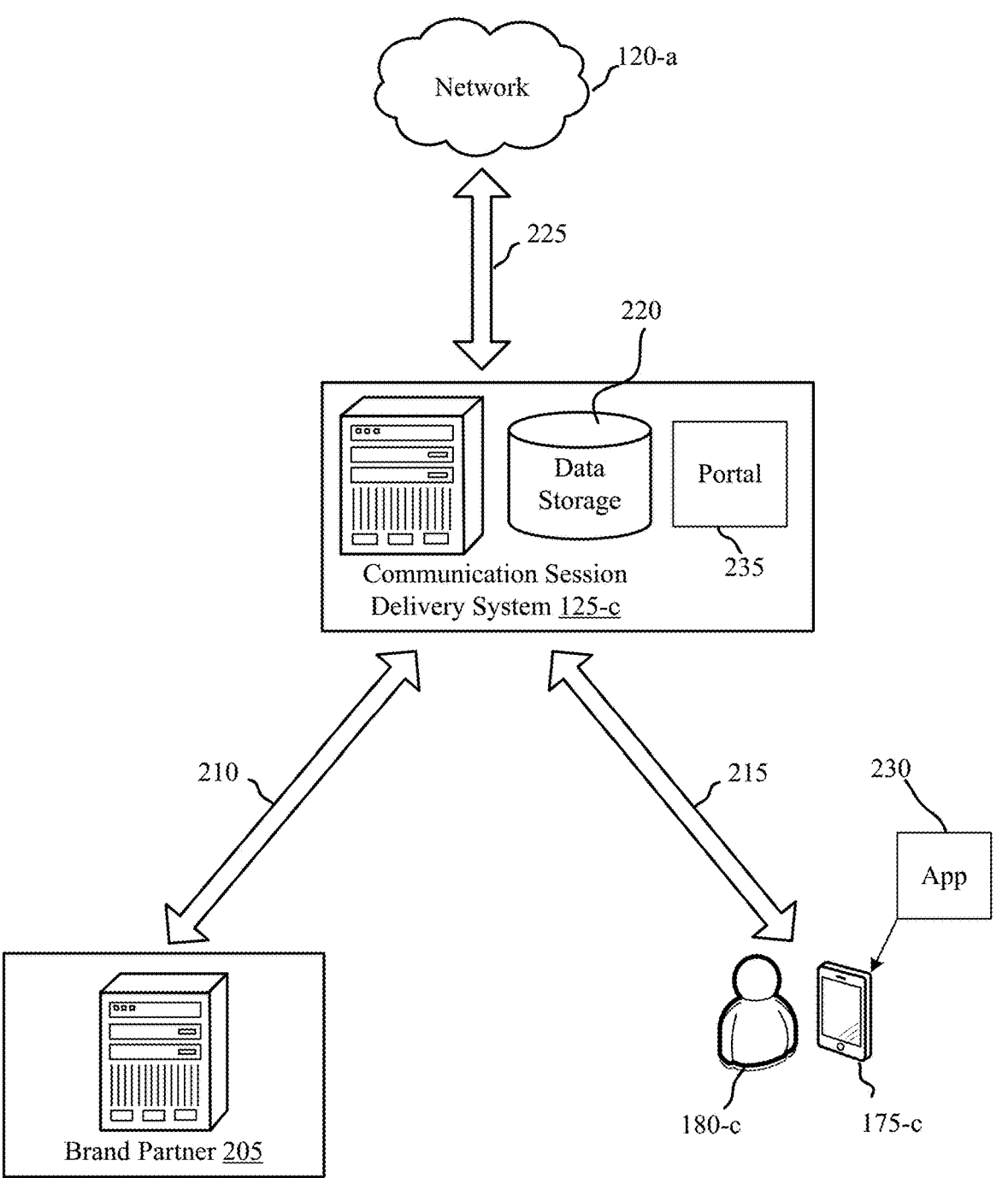
FIG. 2 illustrates an example of a system for wireless communications that supports techniques for providing in-flight communication sessions in accordance with aspects of the present disclosure.

FIG. 2 illustrates an example of a system 200 that supports techniques for providing in-flight communication sessions in accordance with aspects of the present disclosure. System 200 includes communication session delivery system 125-*c*, brand partner 205, network 120-*a*, and mobile device 175-*c* operated by passenger 180-*c*. Brand partner 205 and communication session delivery system 125-*c* may include or utilize various computing components such as data servers and/or data storage systems for facilitating and maintaining communications and supporting offers to facilitate brand interactions and other services. Brand partner 205 may also represent a plurality of affiliated or non-affiliated brand partners. Communication session delivery system 125-*c* may be an example of a communication session delivery system 125 of FIG. 1. Mobile device 175-*c* and passenger 180-*c* may be examples of mobile device 175 and passenger 180 of FIG. 1, respectively.

The entities of system 200 transmit various communication messages between each other, including bidirectional communication 210, bidirectional communication 215, and bidirectional communication 225. For example, bidirectional communication 210 may include brand partner 205 sending one or more reward offers to communication session delivery system 125-*c* for eventual presentation to passenger 180-*c*. Each of the reward offers may be linked to one or more target characteristics that a brand partner may wish to focus its reward offer towards. For example, if the reward offer is tailored to a specific gender, a brand partner may indicate that the reward offer's target characteristic is either male or female. In some examples, communication session delivery system 125-*c* may retrieve reward offers from data storage 220 or from network 120-*a* via bidirectional communication 225. A reward offer may include a communication session that is awarded to a passenger when the passenger completes a specified brand interaction. A communication session may be network access service for at least a portion of the travel segment, access to a media content item (e.g., visual media, audio media, games, etc.), or a combination thereof. Access to media content items may also be referred to as in-flight entertainment (IFE). IFE may be hosted on the aircraft and may include content that is otherwise unavailable (e.g., pre-release movies that have not yet become available for streaming). Brand interactions may be categorized as a media item (e.g., displayed advertisement, promotional video), a social media interaction (e.g., a post mentioning the brand), a creation of a user account, a purchase of a good or service, a completion of a survey, a reservation of a good or service, an indication of interest in a good or service (e.g., submitting a positive feedback of the good or service, placing the good or service in a virtual cart, etc.), or a combination thereof.

Communication session delivery system 125-*c* may receive profile information of one or more passengers and/or of a travel segment from network 120-*a* via bidirectional communication 225 or from data storage 220. In some examples, a travel provider of the travel segment may update communication session delivery system 125-*c* with the passengers' profile information either periodically or aperiodically via bidirectional communication 225. The profile information may include any information that the travel provider may possess regarding a passenger and characteristics of the travel segment that the passenger is booked for. For example, the profile information may include user characteristics such as gender, age, originating/destination location, type of traveler (business, pleasure, etc.), frequency of travel, traveling with a family or group, class of travel for a passenger, etc. In another example, the characteristics of the travel segment may include an origin of the travel segment, a destination of the travel segment, respective passenger classes for passengers, a duration of the travel segment, or a type of vessel for the travel segment.

Communication session delivery system 125-*c* may aggregate the one or more reward offers from brand partner 205 with other reward offers from other brand partners to obtain a pool of reward offers for the travel segment. In some cases, communication session delivery system 125-*c* may apply a scarcity factor to the pool of reward offers (e.g., may determine the pool of reward offers based on the scarcity factor). Communication session delivery system 125-*c* may apply a scarcity factor to the pool of reward offers in order to introduce an artificial limitation upon the pool of reward offers. This artificial limitation of the pool of reward offers may be utilized to induce competition for reward offers, which may result in heightened urgency for passengers 180 in claiming reward offers. The scarcity factor may involve limiting the supply of the reward offers (e.g., such that not all passengers may be able to obtain a reward offer or enough reward offers to obtain communication sessions lasting the duration of the flight), limiting the amount of time a reward offer is available, or similar techniques for introducing urgency.

In some cases, communication session delivery system 125-c may determine the scarcity factor based on one or more known or expected characteristics (e.g., quantity of passengers, duration of travel segment, aggregate number of access minutes, etc.) of the travel segment when selecting the pool of rewards offers. For example, the scarcity factor may be chosen such that the number of reward offers in the pool is proportional to the total number of passengers on the travel segment (e.g., if one hundred passengers are expected for a travel segment, communication session delivery system 125-c may only offer the number of communication sessions equal to half (or some other multiple) of the quantity of passengers). In another example, communication session delivery system 125-c may only offer a predetermined amount of time corresponding to the pool of rewards. In some examples, communication session delivery system 125-c may also determine the scarcity factor by factoring a total duration of a travel segment and/or a quantity of passengers of the travel segment. For example, communication session delivery system 125-c may only offer 1000 aggregate minutes of network access to all passengers for the travel segment, where the aircraft may have 100 passengers for the travel segment and the travel segment may be one hour long. That is, communication session delivery system 125-c may determine a total number of passenger minutes based on the quantity of passengers (e.g., a passenger capacity of the aircraft or a quantity of booked passengers) and the duration of the travel segment (e.g., gate-to-gate duration, flight duration, or duration of communications taking into account device restrictions during the flight). Communication session delivery system 125-c may then determine the aggregate minutes of network access to be offered based on the total number of passenger minutes and a scarcity factor. A value of the scarcity factor applied to the reward offers may be presented to the passengers along with the associated reward offers. Application of the scarcity factor may better encourage passengers of the travel segment to engage with reward offers than if the reward offers were offered without restrictions. For example, passengers may be encouraged to engage with reward offers earlier, before the available offers are taken by other passengers.

With the profile information, communication session delivery system 125-c may select a subset of the pool of reward offers, where the subset may be one or more reward offers from the pool of reward offers. Communication session delivery system 125-c may select the subset of reward offers as being tailored to a particular passenger or group of passengers of a travel segment (e.g., passenger 180-c). Communication session delivery system 125-c may choose the subset of reward offers based on the profile information of the particular passenger or group of passengers, and/or a characteristic of the particular travel segment. In some cases, communication session delivery system 125-c may determine a quantity of reward offers it will select and present to passenger 180-c based on a predetermined number, a quantity of passengers on a travel segment, a duration of the travel segment, or a maximum number of reward offers for the passengers of the travel segment.

The one or more reward offers from brand partner 205 may each include a bid associated with the communication session. The bids may indicate a reward offer arrangement which describes a value (e.g., monetary value) that brand partner 205 may confer if its respective reward offer is selected and completed by a passenger. In some cases, communication session delivery system 125-c may select the pool of reward offers based on the bids. For example, communication session delivery system 125-c may select those rewards with the highest bids, or the rewards with the highest bids within categories of reward offers (e.g., associated with different types of brand interactions). In some examples, communication session delivery system 125-c may select a certain quantity of reward offers to be available for each of multiple types of brand interactions, and then select the rewards with the highest bids for each type.

Upon selection of the subset of reward offers, communication session delivery system 125-c may transmit the subset of reward offers over bidirectional communication 215 to a device belonging to passenger 180-c (e.g., mobile device 175-c). The subset of reward offers may be presented to the passenger 180c via a portal 235 hosted by communication session delivery system 125-c or application 230 on mobile device 175-c. Passenger 180-c may view the selected reward offers through the portal 235 or application 230 on mobile device 175-c either prior or during the travel segment. Although not illustrated, mobile device 175-c may be a seat-mounted video system on board the aircraft. Passenger 180-c may choose one or more reward offers from the subset of reward offers and may then proceed to complete a brand interaction associated with the chosen reward offer. In some examples, passenger 180-c may request that the presented subset of reward offers be changed or otherwise modified. A benefit of allowing passenger 180-c to request that the presented subset of reward offers be changed is that a first presented subset of reward offers may be unsatisfactory to passenger 180-c. Allowing modification to the first presented subset of reward offers may allow passenger 180-c to discover a reward offer from a subsequent subset of reward offers (with the subsequent subset of reward offers having at least one changed presented reward offer from the first presented subset of reward offers) that may appeal to passenger 180-c. Upon receiving the request, communication session delivery system 125-c may provide a modified subset of reward offers to passenger 180-c, where the modified subset of reward offers is different from the previous subset of reward offers.

When passenger 180-c selects a reward offer, mobile device 175-c may transmit an indication of the selected reward offer to communication session delivery system 125-c via bidirectional communication 215. Performance of the brand interaction may then occur via communication session delivery system 125-c, via the respective brand partner 205, or via a third entity (e.g., media server). For example, communication session delivery system 125-c may forward session information associated with the passenger-selected reward offer to a respective brand partner 205 via bidirectional communication 210. Brand partner 205 may monitor various brand interactions and then verify when a brand interaction associated with the session information has occurred or is complete. Upon the verification, brand partner 205 may indicate to communication session delivery system 125-c via bidirectional communication 210 that the brand interaction associated with the session information has occurred. In another example, although not shown, a passenger 180-c with mobile device 175-c may interact directly with brand partner 205 or with a third entity hosting the brand interaction for the brand partner 205. Passenger 180-c may complete a brand interaction in direct communication with brand partner 205 or the third entity, and upon completion of the brand interaction, brand partner 205 may indicate to communication session delivery system 125-c to provide communication session access to passenger 180-c. In some examples, communication session delivery system 125-c may provide a unique identifier associated with passenger 180-c or mobile device 175-c to brand partner 205 or other outside parties in order to enable brand partner 205 or the outside parties to authorize and link the reward to passenger 180-*c* and/or mobile device 175-*c*. For example, the unique identifier may be generated based on an identifier associated with passenger 180-*c* or mobile device 175-*c*, but that is not traceable by brand partner 205 or other entities to passenger 180-*c* or mobile device 175-*c*. In one example, the unique identifier is based on (e.g., hashed or encrypted) the media access control (MAC) address of mobile device 175-*c*. Upon receiving confirmation that the brand interaction has been complete, communication session delivery system 125-*c* may associate the mobile device 175-*c* with the reward associated with the reward offer. For example, communication session delivery system 125-*c* may associate the MAC address of mobile device 175-*c* with access to a session of a duration associated with the reward. In other examples, communication session delivery system 125-*c* may present a redemption code to passenger 180-*c* upon completion of a brand interaction where passenger 180-*c* may redeem the redemption code at a later time (e.g., via the same or a different device) for access to a communication session.

Upon receiving the indication, redemption code, or another indication of access, communication session delivery system 125-*c* may activate access to passenger 180-*c* to the associated reward (e.g., communication session or media experience) linked to the passenger-selected reward offer. For example, communication session delivery system 125-*c* may establish a communication session for mobile device 175-*c* via a network access device (e.g., multi-user access terminal 170) over a wireless communications link for a session duration associated with the reward offer. In some examples, communication session delivery system 125-*c* may determine an identifier of a device (e.g., MAC address) that is linked to the completed brand interaction and establish the communication session based on the identifier of the device. Under some circumstances, communication session delivery system 125-*c* may determine a duration of the reward and then present to mobile device 175-*c* a comparison of the duration to a length of time of the travel segment, where the comparison may be continually updated and presented. For example, if the reward is one hour of network access time and the remaining duration of the travel segment is two hours, mobile device 175-*c* may continually provide the comparison to passenger 180-*c* when passenger 180-*c* views the application 230 or portal 235.

In some examples, communication session delivery system 125-*c* may receive a unique identifier linked to passenger 180-*c*. For example, passenger 180-*c* may have registered a login profile with the portal 235 of communication session delivery system 125-*c*. In some cases, passenger 180-*c* may complete multiple brand interactions associated with multiple reward offers and communication session delivery system 125-*c* may link the multiple reward offers to the unique identifier of passenger 180-*c*. For example, if passenger 180-*c* has logged on and completed five brand interactions each worth 10 minutes of network access time, communication session delivery system 125-*c* may link 50 minutes of network access time to the user account of passenger 180-*c*. In other examples, communication session delivery system 125-*c* may identify one or more past brand interactions that passenger 180-*c* has performed under his unique identifier. With these past completed brand interactions, communication session delivery system 125-*c* may select reward offers from the pool of reward offers for a given travel segment to present to passenger 180-*c* based on the brand interaction history of passenger 180-*c*.

Communication session delivery system 125-*c* may also include data storage 220. In some examples, data storage 220 may receive and store verified completions of brand interactions for a particular travel segment. In a subsequent travel segment, communication session delivery system 125-*c* may receive reward offers from brand partner 205 or from other brand partners for the subsequent travel segment in a similar manner as described above. In some examples, communication session delivery system 125-*c* may choose the pool of reward offers for the subsequent travel segment base on the stored verified completions of brand interactions from a previous travel segment. Communication session delivery system 125-*c* may also choose respective subsets of the pool of reward offers for the subsequent travel segment based on profile information of the passengers of the subsequent travel segment. The profile information may similar profile information described above. The verified completions of brand interactions from the previous travel segment may better inform communication session delivery system 125-*c* as to which reward offers have been successful in the past.

In some examples, communication session delivery system 125-*c* may store verified completions of brand interactions of a particular passenger (e.g., passenger 180-*c*) in data storage 220. This data may be linked to a user account of passenger 180-*c* or a unique identifier associated with a device of passenger 180-*c* (e.g., MAC address). In some cases, communication session delivery system 125-*c* may use the verified completions of brand interactions of passenger 180-*c* to inform the selection of a subset of reward offers that are to be presented to passenger 180-*c*. In other examples, communication session delivery system 125-*c* may use the verified completions of brand interactions of passenger 180-*c* to exclude reward offers from being presented to passenger 180-*c* in a subset of reward offers. For example, excluded reward offers may be types of brand interactions that passenger 180-*c* has already completed or types of media experiences that passenger 180-*c* has already consumed (e.g., already viewed certain brand content). Additionally, communication session delivery system 125-*c* may utilize stored verified completions of brand interactions to determine trends for similar travel segments and use the determinations to select future reward offers for passengers on future similar travel segments. For example, travel segments with similar characteristics such as time of day, origin, destination, etc., may inform communication session delivery system 125-*c* on selections of future reward offers to present on similar travel segments.

In another example, communication session delivery system 125-*c* may determine categories for each reward offer that it receives. Communication session delivery system 125-*c* may further determine categories of reward offers that passenger 180-*c* has selected in the past and then select a subset of reward offers to present to passenger 180-*c* based on which categories of reward offers that passenger 180-*c* has previously selected. For example, if passenger 180-*c* has selected previous reward offers involving social media posts, communication session delivery system 125-*c* may present more reward offers that involve completing social media posts to passenger 180-*c*. In some cases, communication session delivery system 125-*c* may exclude presenting certain categories of reward offers that passenger 180-*c* has shown a lack of engagement with. For example, if passenger 180-*c* has never selected previous reward offers involving purchasing goods or services, communication session delivery system 125-c may exclude presenting reward offers that involve the purchase of goods and services.

In some cases, communication session delivery system 125-c may identify from data storage 220 how a particular type of passenger has interacted with a certain reward offer. For example, the interaction history data may indicate if the passenger viewed the offer and did not accept the offer, if the passenger viewed the offer and did accept the offer, if the viewer viewed the offer and attempted the brand interaction unsuccessfully, if the viewer viewed the offer and attempted the brand interaction successfully, etc. Communication session delivery system 125-c may use the interaction history data and associated passenger profile information to inform which reward offers from brand partner 205 to select and present to passengers. In another example, communication session delivery system 125-c may determine a metric from the prior interactions of passenger 180-c with the reward offers. These metrics may be a completion rate of the one or more of the plurality of reward offers (e.g., a rate at which passengers complete the brand interaction once they have selected it), a number of impressions for the one or more of the plurality of reward offers, a number of passenger selections of the one or more of the plurality of reward offers, a number of media initiations associated with the one or more of the plurality of reward offers (e.g., a number of times that viewing a media item associated with a reward offer has been started), a number of media completions associated with the one or more of the plurality of reward offers (e.g., a number of times that viewing a media item associated with a reward offer has been completed), or a combination of these metrics. Communication session delivery system 125-c may deliver one or more of these metrics to brand partner 205 over bidirectional communication 210.

Communication session delivery system 125-c may also possess additional features. For example, aggregate rewards may be split between multiple devices (e.g., a user account may be accessed from multiple devices). Some entertainment features may be tailored specifically for children. The reward offers may include IFE (e.g., content such as visual media, audio media, games), and passenger 180-c may consume this content on his or her personal device during the travel segment. A reward offer may also provide access to a moving map which may illustrate where a vessel is geographically on the travel segment. A reward offer may also be presented as a gift to an acquaintance of passenger 180-c. Additionally, passenger 180-c may refer the acquaintance and earn bonus time of network access or access to media content (e.g., IFE).

Figure 3:
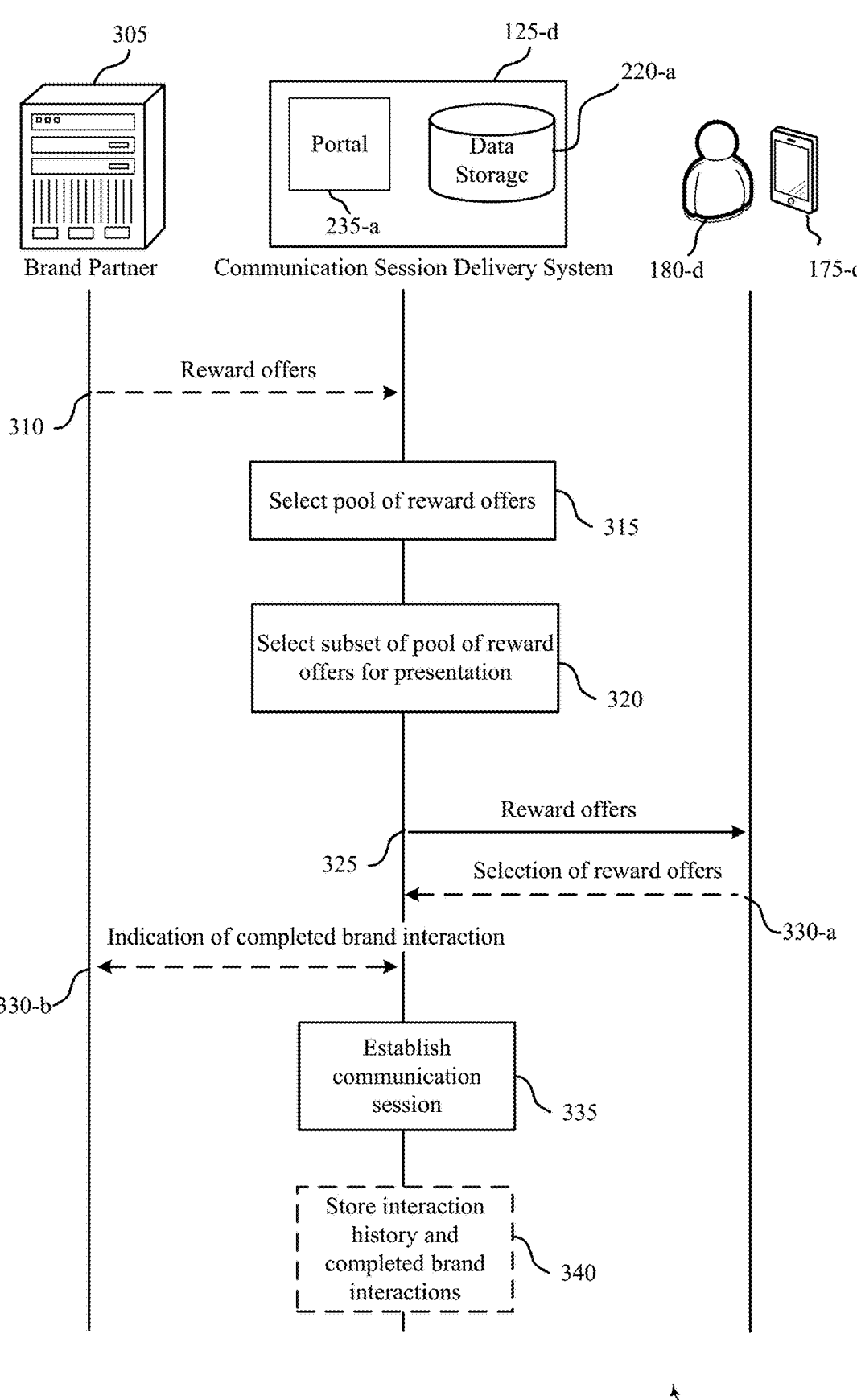
FIG. 3 illustrates an example of a process flow that supports techniques for providing in-flight communication sessions in accordance with aspects of the present disclosure.

FIG. 3 illustrates an example of a process flow 300 that supports techniques for providing in-flight communication sessions in accordance with aspects of the present disclosure. The process flow may include communication session delivery system 125-d, brand partner 305, and mobile device 175-d operated by passenger 180-d. Communication session delivery system 125-d may be an example of a communication session delivery system 125 of FIG. 1 or of communication session delivery system 125-c of FIG. 2. Brand partner 305 may be an example of brand partner 205 of FIG. 2. Mobile device 175-d and passenger 180-d may be examples of mobile device 175 and passenger 180 of FIG. 1 and of mobile device 175-c and passenger 180-c of FIG. 2, respectively.

At 310, communication session delivery system 125-d may receive reward offers from brand partner 305 for eventual presentation to passenger 180-d, for example, on mobile device 175-d. Each of the reward offers may be linked to one or more target characteristics that brand partner 305 may wish to focus its reward offer towards. For example, FIG. 4 which illustrates a graphical representation 400 of reward offers in accordance with aspects of the present disclosure, depicts reward offers 405 from brand partners 305-a and 305-b. Reward offers 405 may include individual reward offers 410. Each reward offer 410 may include a brand interaction 430 and a reward 435. As received from a brand partner 305, the reward may be expressed in a currency (e.g., USD), and the communication session delivery system 125-d may translate the reward into a communication experience (e.g., minutes for a communication session, media experience) for presentation to passengers 180. In this example, reward offers 410-a, 410-b, and 410-c may come from or be sponsored by brand partner 305-a, while reward offers 410-d, 410-c, 410-f, and 410-g may come from or be sponsored by brand partner 305-b. In some examples, communication session delivery system 125-d may retrieve reward offers from data storage 220-a or from another external entity (not shown). Reward offers 405 may represent a total of the reward offers provided by brand partners 305.

Figure 4:
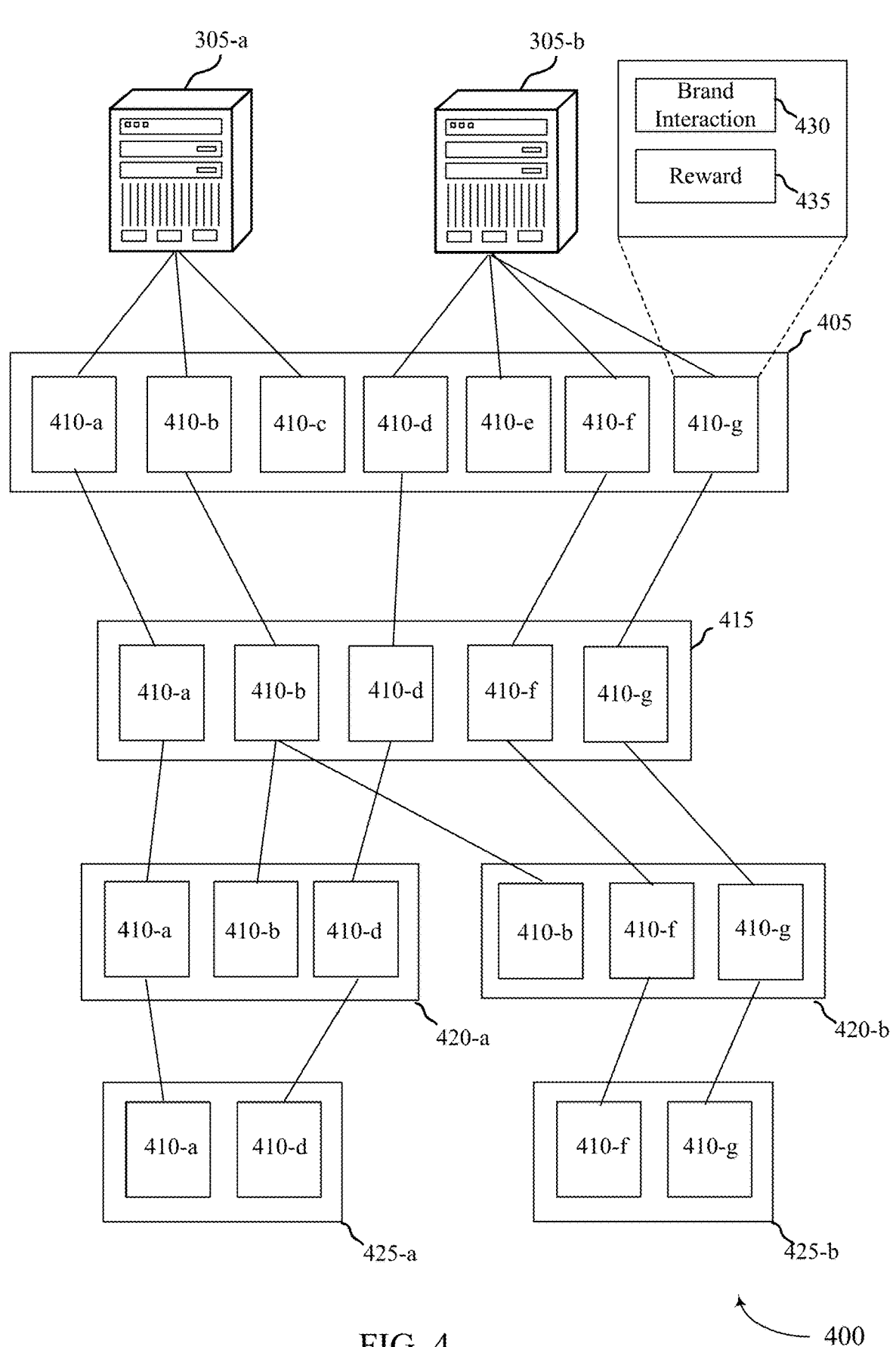
FIG. 4 illustrates a graphical representation of reward offers in accordance with aspects of the present disclosure.

At 315, communication session delivery system 125-d may evaluate profile information for a travel segment and select a pool of reward offers for the travel segment. For example, communication session delivery system 125-d may evaluate profile information of the passengers and characteristics of the travel segment to select a subset of the reward offers 405 to generate a pool of reward offers 415 for the travel segment as shown in FIG. 4. The pool of reward offers 415 may have a scarcity factor relative to a number of passengers (e.g., capacity or booked passengers) and duration of the travel segment as described above. In the example shown in FIG. 4, the pool of reward offers 415 includes reward offers 410-a, 410-b, 410-d, 410-f, and 410-g, but reward offers 410-c and 410-e have not been included in the pool of reward offers 415. Communication session delivery system 125-d may receive profile information of one or more passengers and/or of a travel segment from data storage 220-a or from a travel provider (not shown).

At 320, communication session delivery system 125-d may select a subset of the pool of reward offers, where the subset may be one more reward offers from the pool of reward offers. Communication session delivery system 125-d may select a subset of reward offers that is tailored to a passenger (e.g., passenger 180-d) or group of passengers for an upcoming travel segment. Communication session delivery system 125-d may choose the subset of reward offers based on the profile information of passenger 180-d and/or a characteristic of the upcoming travel segment. For example, referring to FIG. 4, communication session delivery system 125-d may select a subset of reward offers 420-d for passenger 180-d which includes reward offers 410-a, 410-b, and 410-d from the pool of reward offers 415. In some examples, communication session delivery system 125-d may select a subset of reward offers for a group of passengers of a travel segment. For example, subset of reward offers 420-a may also be selected for another passenger traveling on the same travel segment that passenger 180-d is traveling on. Communication session delivery system 125-d may select additional subsets of reward offers for additional passengers or groups of passengers. For example, subset 420-b, including reward offers 410-b, 410-f, and 410-g may be selected for a different passenger. As shown in FIG. 4, some of the subsets of reward offers 420 for different passengers or groups of passengers may include some of the same reward offers 410 (e.g., they may be partially overlapping subsets). If a reward offer is selected by a passenger, it may be removed from other subsets of reward offers 420 in which it appeared.

Along with being presented with subset of reward offers 420-*a*, passenger 180-*d* may be informed that only a quantity of communication sessions are available corresponding to the number of reward offers in the pool of reward offers 415 to be redeemed for the flight segment. Passenger 180-*d* may be presented with an option to update the subset of reward offers 420-*a* if they do not want to select the reward offers presented to them. Upon requesting update of the subset of reward offers 420-*a*, communication session delivery system 125-*d* may select a new subset of reward offers 420 from the pool of reward offers 415.

Communication session delivery system 125-*d* may exclude reward offers from the subset of reward offers 420 for a passenger based on completed brand interactions by the passenger. For example, passenger 180-*d* may have already performed a brand interaction associated with reward offer 410-*f*, and thus reward offer 410-*f* may be excluded from subset of reward offers 420-*a*. Additionally or alternatively, communication session delivery system 125-*d* may categorize the brand interactions of the reward offers 410, and may select the subset of reward offers based on prior interactions of passenger 180-*d*. For example, where the passenger has selected certain categories (e.g., media item, a social media interaction, a creation of a user account, a purchase of a good or service, a completion of a survey, a reservation of a good or service, an indication of interest in a good or service) of reward offers 410 for previous travel segments, the subset of reward offers 420-*a* may include offers from those categories and exclude other categories for which the passenger has not selected reward offers, or which are different from categories they have selected. For example, if the passenger has selected reward offers with brand interactions involving consuming media content such as ads, but has not selected brand interactions related to the purchase of goods and services even though presented with a quantity of reward offers in this category greater than a threshold, the subset of reward offers 420-*a* may exclude brand interactions related to the purchase of goods and services.

At 325, communication session delivery system 125-*d* may transmit the subset of reward offers to device 175-*d* belonging to passenger 180-*d*. Passenger 180-*d* may view the subset of selected reward offers through a portal 235-*a* hosted by communication session delivery system 125-*d*, or via an application on mobile device 175-*d* (not shown) either prior or during the travel segment.

At 330-*a*, passenger 180-*d* may choose one or more reward offers from the subset of reward offers 420-*a* and may then proceed to complete a brand interaction associated with the chosen reward offers. For example, referring to FIG. 4, passenger 180-*d* may make a selection of reward offers 425-*a* which includes reward offers from subset of reward offers 420-*a*. Selection of reward offers 425-*a* may include reward offers 410-*a* and 410-*d*, for example. Passenger 180-*d* may proceed to complete a brand interaction associated with the chosen reward offer. Passenger 180-*d* may complete multiple brand interactions and aggregate the rewards associated with the multiple brand interactions. Passenger 180-*d* may create a user account with communication session delivery system 125-*d* and may store and/or visualize completed brand interactions and rewards associated with the user account in an online portal. The aggregated rewards may be redeemed on multiple travel segments. A user application may indicate to passenger 180-*d* when the rewards may be redeemed. In some examples, passenger 180-*d* may purchase additional rewards. In other examples, passenger 180-*d* may transfer or gift one or more accumulated rewards to another passenger. In some cases, passenger 180-*d* may persuade another passenger to complete one or more brand interactions and passenger 180-*d* may earn additional rewards based on the referral.

At 330-*b*, communication session delivery system 125-*d* may receive an indication of completion of one or more brand interactions associated with the selected reward offers. For example, passenger 180-*d* may complete a brand interaction in direct communication with brand partner 305, and upon completion of the brand interaction, brand partner 305 may indicate to communication session delivery system 125-*d* to provide communication session access to passenger 180-*d*. In another example, at 330-*b*, when passenger 180-*d* selects a reward offer, mobile device 175-*d* may transmit an indication of the selected reward offer to communication session delivery system 125-*d*. Communication session delivery system 125-*d* may then forward session information associated with the passenger-selected reward offer to brand partner 305. Brand partner 305 may monitor various brand interactions and then verify when a brand interaction associated with the session information has occurred. Upon the verification, brand partner 305 may indicate to communication session delivery system 125-*d* that the brand interaction associated with the session information has occurred.

At 335, communication session delivery system 125-*d* may activate access to passenger 180-*d* to the associated reward (e.g., communication session or media experience) linked to the passenger-selected reward offer. For example, communication session delivery system 125-*d* may establish a communication session between mobile device 175-*d* and other networks via a network access device (e.g., multi-user access terminal 170) over a wireless communications link for a session duration associated with the reward offer. A characteristic of the communication session may be based on the associated reward linked to the passenger-selected offer. In some examples, the characteristic of the communication session may be a total amount of time allotted to the communication session, a data rate of the communication session, a total amount of data communicated for the communication session, access to one or more service types (text, email, streaming), access to one or more network destinations (e.g., Netflix, Amazon), or a combination thereof.

At 340, communication session delivery system 125-*d* may store passenger interaction history data and completed brand interactions in data storage 220-*a*. In an example, communication session delivery system 125-*d* may choose to present certain reward offers for a subsequent travel segment informed by the stored verified completions of brand interactions from a previous travel segment. This data may be linked to a user account of passenger 180-*d*. In some cases, communication session delivery system 125-*d* may identify from data storage 220-*a* how a particular type of passenger has interacted with a certain reward offer. Communication session delivery system 125-*d* may use the interaction history data and associated passenger profile information to inform which reward offers from brand partner 305 to select and present to passengers.

Figure 5:
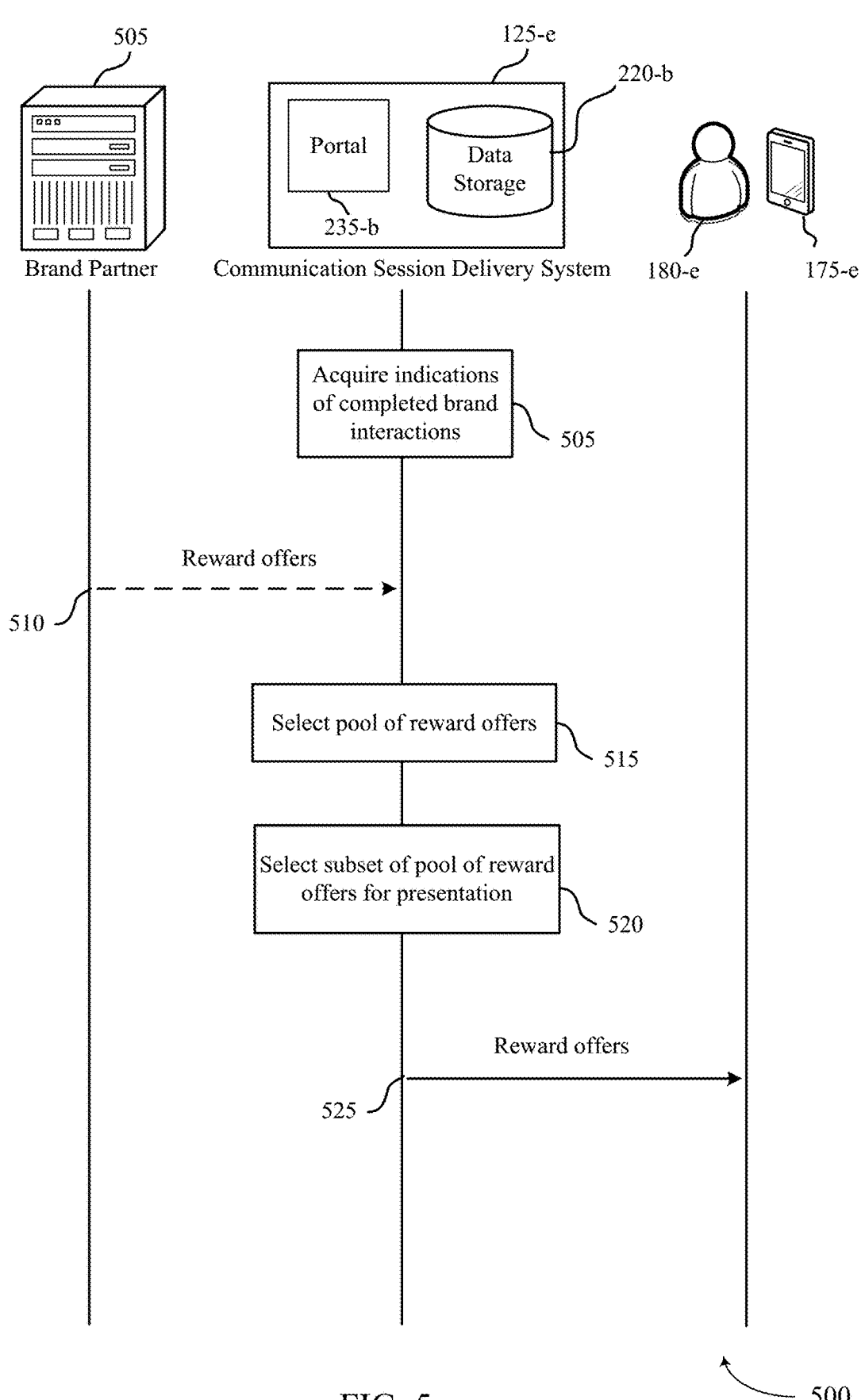
FIG. 5 illustrates an example of a process flow that supports techniques for providing in-flight communication sessions in accordance with aspects of the present disclosure.

FIG. 5 illustrates an example of a process flow 500 that supports techniques for providing in-flight communication sessions in accordance with aspects of the present disclosure. The process flow may include communication session delivery system 125-*c*, brand partner 505, and mobile device 175-*e* operated by passenger 180-*c*. Communication session delivery system 125-*e* may be an example of a communication session delivery system 125 of FIG. 1 or of communication session delivery system 125-c of FIG. 2. Brand partner 505 may be an example of brand partner 205 of FIG. 2 or brand partner 305 of FIG. 3. Mobile device 175-e and passenger 180-e may be examples of mobile device 175 and passenger 180 of FIG. 1 and of mobile device 175-c and passenger 180-c of FIG. 2, respectively.

Process flow 500 may include features that follow from process flow 300 of FIG. 3, however, process flow 500 may apply to a subsequent travel segment than the travel segment of process flow 300. For example, at 505, communication session delivery system 125-c may acquire indications of completed brand interactions. The indications of completed brand interactions may have occurred over one or more previous travel segments prior to 505. Communication session delivery system 125-e may have acquired the indications of completed brand interactions directly from one or more brand partners 505, one or more passengers 180, or from stored completed brand interactions from data storage 220-b.

At 510, communication session delivery system 125-e may receive reward offers from brand partner 505 for eventual presentation to passenger 180-e, for example, on mobile device 175-e. Each of the reward offers may be linked to one or more target characteristics that brand partner 505 may wish to focus its reward offer towards.

At 515, communication session delivery system 125-e may evaluate profile information for a travel segment and select a pool of reward offers for the travel segment. For example, communication session delivery system 125-e may evaluate profile information of the passengers and characteristics of the travel segment to select a subset of reward offers received from brand partners including brand partner 505 to generate a pool of reward offers for the travel segment. Communication session delivery system 125-e may receive profile information of one or more passengers and/or of a travel segment from data storage 220-b or from a travel provider (not shown).

At 520, communication session delivery system 125-e may select a subset of the pool of reward offers, where the subset may be one more reward offers from the pool of reward offers. Here, communication session delivery system 125-e may select a subset of reward offers that is tailored to passenger 180-e for the travel segment associated with process flow 500. Communication session delivery system 125-e may choose the subset of reward offers based on the profile information of passenger 180-e and/or a characteristic of the upcoming travel segment. Additionally, communication session delivery system 125-e may choose the subset of reward offers based on the indications of completed brand interactions acquired at 505. In other words, communication session delivery system 125-e may utilize the indications of completed brand interactions to determine which reward offers have been successful in the past, and inform the selection of subset of reward offers at 520 and in all future selections of reward offers.

At 525, communication session delivery system 125-e may transmit the subset of reward offers to device 175-e belonging to passenger 180-e. The passenger may then select reward offers, complete brand interactions, and redeem the reward of the selected reward offers as described above.

Figure 6:
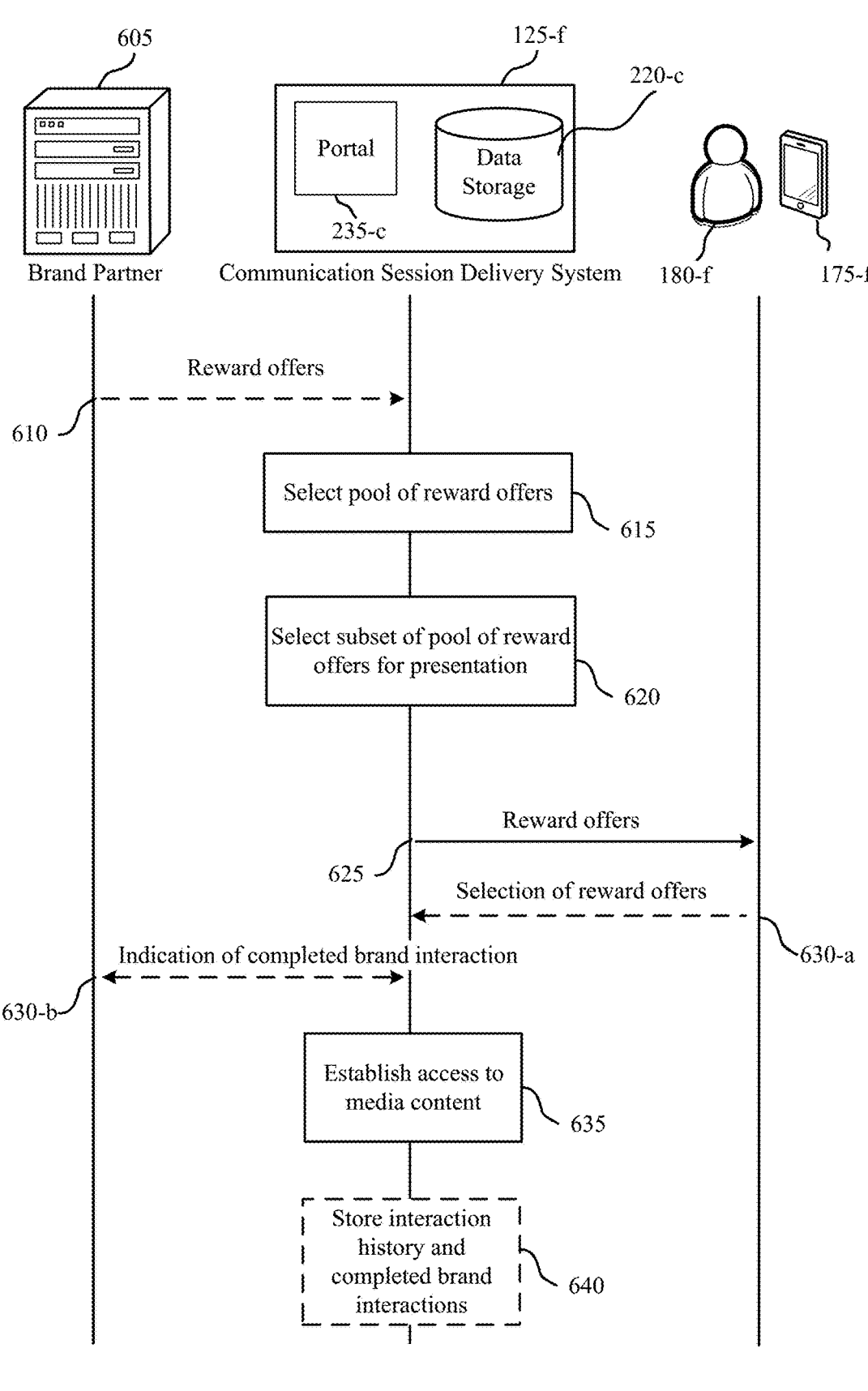
FIG. 6 illustrates an example of a process flow that supports techniques for providing in-flight communication sessions in accordance with aspects of the present disclosure.

FIG. 6 illustrates an example of a process flow 600 that supports techniques for providing in-flight communication sessions in accordance with aspects of the present disclosure. The process flow may include communication session delivery system 125-f, brand partner 605, and mobile device

175-f operated by passenger 180-f. Communication session delivery system 125-f may be an example of a communication session delivery system 125 of FIG. 1 or of communication session delivery system 125-c of FIG. 2. Brand partner 605 may be an example of brand partner 205 of FIG. 2. Mobile device 175-f and passenger 180-f may be examples of mobile device 175 and passenger 180 of FIG. 1 and of mobile device 175-c and passenger 180-c of FIG. 2, respectively.

At 610, communication session delivery system 125-f may receive reward offers from brand partner 605 for eventual presentation to passenger 180-f, for example, on mobile device 175-f. Each of the reward offers may be linked to one or more target characteristics that brand partner 605 may wish to focus its reward offer towards. Each of the reward offers may include a reward corresponding to a media content item (e.g., IFE) that may be consumed by a passenger on the travel segment. For example, the reward offer may be a particular amount of time for viewing media content items or playing games, or may be access to a particular media content item (e.g., a particular game or content item). The media content items may be hosted on the communication session delivery system 125-f on the aircraft or other transport vessel.

At 615, communication session delivery system 125-f may evaluate profile information for a travel segment and select a pool of reward offers for the travel segment. For example, communication session delivery system 125-f may evaluate profile information of the passengers and characteristics of the travel segment to select a subset of the reward offers received from brand partners including brand partner 605 to generate a pool of reward offers for the travel segment. Communication session delivery system 125-f may receive profile information of one or more passengers and/or of a travel segment from data storage 220-c or from a travel provider (not shown).

At 620, communication session delivery system 125-f may select a subset of the pool of reward offers, where the subset may be one more reward offers from the pool of reward offers. Communication session delivery system 125-f may select a subset of reward offers that is tailored to a passenger (e.g., passenger 180-f) or group of passengers for an upcoming travel segment. Communication session delivery system 125-f may choose the subset of reward offers based on the profile information of passenger 180-f and/or a characteristic of the upcoming travel segment.

At 625, communication session delivery system 125-f may transmit the subset of reward offers to device 175-f belonging to passenger 180-f. Passenger 180-f may view the subset of selected reward offers through a portal 235-c hosted by communication session delivery system 125-f or through an application on mobile device 175-f (not shown) either prior or during the travel segment. Passenger 180-f may choose one or more reward offers from the selection of reward offers and may then proceed to complete a brand interaction associated with the chosen reward offer.

At 630-a, passenger 180-f may choose one or more reward offers from the subset of reward offers and may then proceed to complete a brand interaction associated with the chosen reward offers. For example, passenger 180-f may make a selection of reward offers which includes reward offers from subset of reward offers. Passenger 180-f may proceed to complete a brand interaction associated with the chosen reward offer.

At 630-b, communication session delivery system 125-f may receive an indication of completion of one or more brand interactions associated with the selected reward offers.

For example, passenger 180-*f* may complete a brand interaction in direct communication with brand partner 605, and upon completion of the brand interaction, brand partner 605 may indicate to communication session delivery system 125-*f* to provide the corresponding media content item to passenger 180-*f*. In another example, at 330-*b*, when passenger 180-*f* selects a reward offer, mobile device 175-*f* may transmit an indication of the selected reward offer to communication session delivery system 125-*f*. Communication session delivery system 125-*f* may then forward session information associated with the passenger-selected reward offer to brand partner 605. Brand partner 605 may monitor various brand interactions and then verify when a brand interaction associated with the session information has occurred. Upon the verification, brand partner 605 may indicate to communication session delivery system 125-*f* that the brand interaction associated with the session information has occurred.

At 635, communication session delivery system 125-*f* may establish access for passenger 180-*f* to the associated reward linked to the passenger-selected reward offer. For example, communication session delivery system 125-*f* may establish access to the media content item that may be streamed from a network access device (e.g., multi-user access terminal 170) to mobile device 175-*f* over a wireless communications link. The media content item may be accessed by passenger 180-*f* anytime during the travel segment. The media content item may include visual media (e.g., movies, television shows, etc.), audio media (e.g., music, podcasts, etc.), games, etc.

At 640, communication session delivery system 125-*f* may store passenger interaction history data and completed brand interactions in data storage 220-*c*. In an example, communication session delivery system 125-*f* may choose to present certain reward offers from a plurality of reward offers for a subsequent travel segment informed by the stored verified completions of brand interactions from a previous travel segment. This data may be linked to a user account of passenger 180-*f*. In some cases, communication session delivery system 125-*f* may identify from data storage 220-*c* how a particular type of passenger has interacted with a certain reward offer. Communication session delivery system 125-*f* may use the interaction history data and associated passenger profile information to inform which reward offers from brand partner 605 to select and present to passengers.

Figure 7:
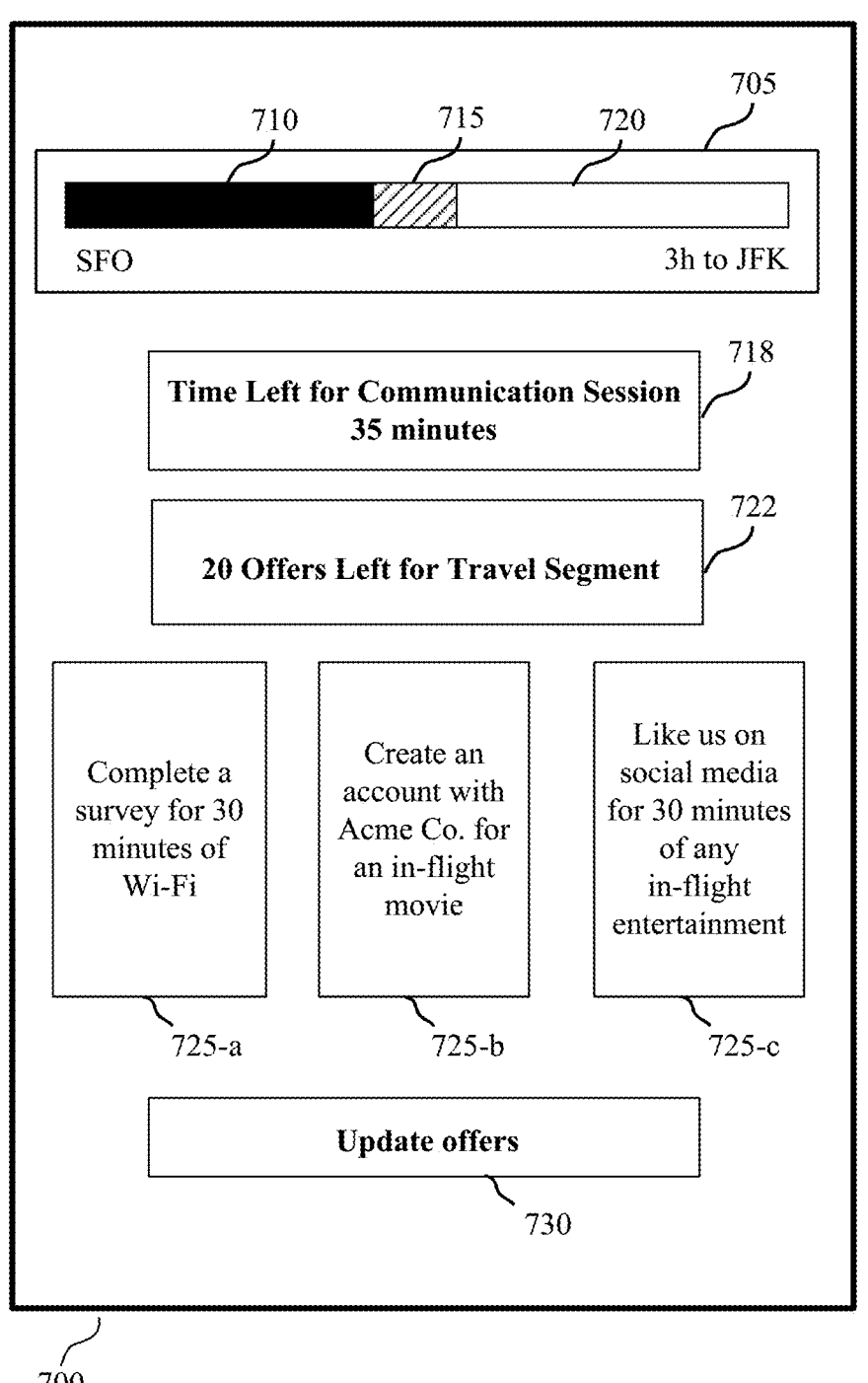
FIG. 7 illustrates a graphical representation of a session interaction interface that supports techniques for offers for providing in-flight communication sessions in accordance with aspects of the present disclosure.

It should be understood that various steps and communications of FIGS. 3-6 may be combined. For example, a pool of reward offers 415 or subset of reward offers 420 may include both reward offers associated with access to communications sessions or media content items, FIG. 7 illustrates a graphical representation of a session interaction interface 700 that supports techniques for providing in-flight communication sessions in accordance with aspects of the present disclosure. In some examples, mobile device 700 may be an example of mobile device 175 of FIGS. 1, 2, 3, 5, and 6.

Session interaction interface 700 may display a portal (e.g., which may be part of an application on the mobile device, or a portal hosted on a different device) which may in turn interact with a communication session delivery system 125. Passenger 180 may create a user account that communication session delivery system 125 may access. In some examples, passenger 180 may utilize the user account to track one or more rewards that passenger 180 has earned through completing respective brand interactions, purchases, referrals, etc. In some cases, communication session delivery system 125 may aggregate the one or more rewards associated with the user account of passenger 180 and determine an aggregate reward for passenger 180. In some examples, the aggregate reward may comprise rewards that are unused and/or unredeemed by passenger 180. In other examples, communication session delivery system 125 may track the portion of rewards that have been used and/or redeemed by passenger 180. In some examples, the user account may be used to apply rewards across travel segments, or across different airlines or other transportation providers. Thus, rewards may be earned and applied to a user account, and the communication session delivery system 125 may access the rewards for redeeming on any travel segment taken by the passenger 180. For example, aspects of a communication session delivery system 125 on an aircraft may access the user account and redeem rewards for a communication session on the aircraft, tracking the portion used on the travel segment on the aircraft, and leaving any unused portion for future travel segments.

Session interaction interface 700 may display certain visualizations that a passenger 180 may interact with in order to access various communication sessions and media experiences. For example, indicator 705 may display the time already traveled during a travel segment 710, the time left for an established communication session 715 (e.g., the time left from the rewards acquired through the selected reward offers), and the time remaining for the travel segment 720. In some examples, the time left for an established communication session 715 may be an unused portion of the aggregate reward associated with the user account of passenger 180. Indicator 718 may also display textually the time left for an established communication session (e.g., an unused portion of the aggregate reward associated with the user account of passenger 180). Indicator 705 may serve to easily convey to a passenger 180 if his communication session will end before the travel segment ends.

Indicator 722 may display a metric that relates to the scarcity factor. For example, indicator 722 may display a quantity of reward offers of a pool of rewards offers for the travel segment. The quantity of reward offers may have a scarcity factor applied. In this example, communication session delivery system 125 has established that only 20 reward offers remain for all the passengers of the mobile vessel of the travel segment. Indicators 725-*a*, 725-*b*, and 725-*c* may display various reward offers that a passenger 180 may select. The reward offers displayed in indicators 725 may have been selected by communication session delivery system 125 from a pool of reward offers based on profile information of the passenger. A passenger 180 may select one of indicators 725 and perform a brand interaction associated with the displayed reward offer in order to accumulate additional rewards for the duration of the travel segment. Session interaction interface 700 may also include an update rewards control 730 that allows the passenger 180 to exchange or update the displayed offers. Selecting update rewards control 730 may replace the reward offers displayed in indicators 725 with a new subset of the pool of reward offers for a travel segment.

Figure 8:
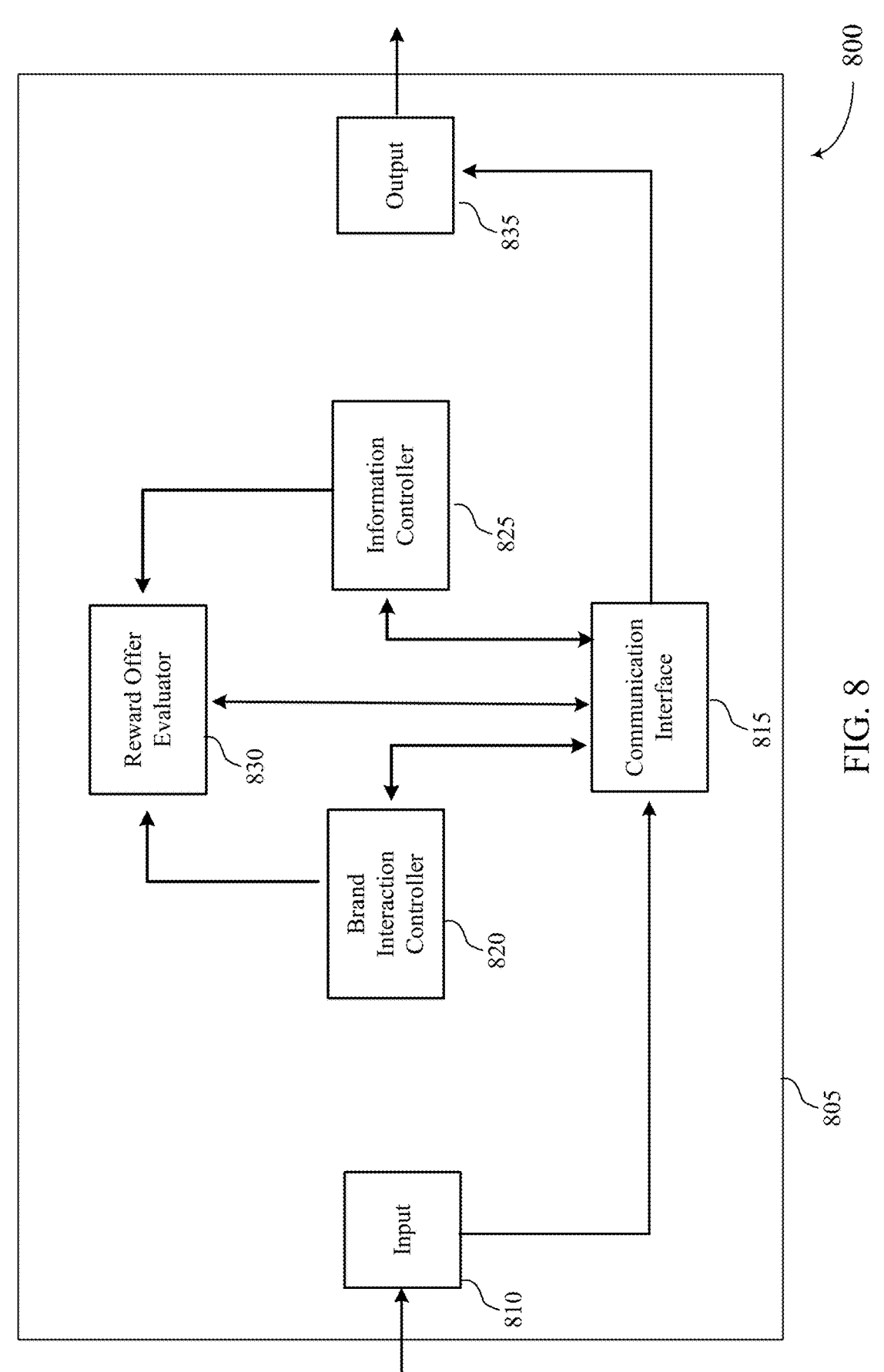
FIGS. 8 and 9 show block diagrams of devices that support techniques for offers for providing in-flight communication sessions in accordance with aspects of the present disclosure.

FIG. 8 shows a block diagram 800 of an apparatus 805 that supports techniques for providing in-flight communication sessions in accordance with aspects of the present disclosure. In some examples, apparatus 805 may be an example of a communication session delivery system 125 of FIGS. 1, 2, and 3. The apparatus 805 may include an input module 810, a communication interface 815, a brand interaction controller 820, an information controller 825, a reward offer evaluator 830, and an output module 835. The apparatus 805 may also include a processor. The components may communicate via one or more buses.

The apparatus 805 and/or at least some of its various sub-components may be implemented in hardware, software executed by a processor, firmware, or any combination thereof. If implemented in software executed by a processor, the functions of the apparatus 805 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The apparatus 805 and/or at least some of its various sub-components may be physically located at various positions, including being distributed such that portions of functions are implemented at different physical locations by one or more physical devices. In some examples, the apparatus 805 and/or at least some of its various sub-components may be a separate and distinct component in accordance with various aspects of the present disclosure. In other examples, the apparatus 805 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The input module 810 may manage input signals for the apparatus 805. For example, the input module 810 may identify input signals associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the apparatus 805 for processing. In some cases, the input module 810 may be a component of an input/output (I/O) controller 915 as described with reference to FIG. 9.

The communication interface 815 may serve as an interface between various modules of the apparatus 805, for example, the brand interaction controller 820, the information controller 825, and the reward offer evaluator 830, and input module 810 and output module 835. The communication interface 815 may provide the subset of the plurality of reward offers to the passenger and establish a communication session over the wireless communications link for a communication device based at least in part on the completion of a respective brand interaction of a selected reward offer. In some examples, the communication interface 815 may present a metric related to the scarcity factor to the passenger with the subset of the plurality of reward offers. This metric may be a quantity of reward offers or a total number of minutes available for a travel segment, which may result from a scarcity factor being applied to a pool of rewards offers for the travel segment. In some cases, the communication interface 815 may receive a unique identifier associated with the passenger. In an additional example, the communication interface 815 may present a redemption code associated with access to the communication session to the passenger based at least in part on receiving the indication of completion of the respective brand interaction, and receive the redemption code at the network access unit.

The communication interface 815 may present a comparison of the unused portion to a length of time of the travel segment to the passenger. In some examples, the communication interface 815 may present the one or more metrics to a respective brand partner associated with the one or more of the plurality of reward offers. In an additional example, the communication interface 815 may receiving, from the passenger, a request for a modification of the subset of the plurality of reward offers. Additionally, the communication interface 815 may receive a selection of a reward offer from the provided subset from the passenger.

The brand interaction controller 820 may receive an indication of completion by the passenger of the respective brand interaction of a selected reward offer of the subset of the plurality of reward offers. In some examples, the brand interaction controller 820 may determine completions of respective brand interactions of prior selected reward offers by the passenger. In some cases, the brand interaction controller 820 may identify one or more past brand interactions associated with the unique identifier. In an additional example, the communication interface 815 may identify one or more verified brand interactions associated with the unique identifier and aggregate values of respective rewards of each of the verified brand interactions associated with the unique identifier. A verified brand interaction may be a brand interaction conducted by a passenger of a travel segment that the brand interaction controller 820 has confirmed. In some cases, the brand interaction controller 820 may receive a second indication of the reward associated with the selected reward offer.

The information controller 825 may identify profile information of a plurality of passengers scheduled for a travel segment of the transport vessel. In some examples, the information controller 825 may identify one or more metrics associated with prior interaction with one or more of the plurality of reward offers. In some cases, the information controller 825 may identify an identifier of the communication device associated with the verified completion of the respective brand interaction. In another example, the information controller 825 may determine interaction history data associated with the received plurality of reward offers. Additionally, the information controller may provide a unique identifier associated with the passenger.

The reward offer evaluator 830 may receive a plurality of reward offers and select a subset of the plurality of reward offers for a passenger from the plurality of passengers. In some examples, the reward offer evaluator 830 may determine a quantity of the group of reward offers based at least in part on a predetermined number. In some cases, the reward offer evaluator 830 may exclude reward offers of the plurality of reward offers associated with the completed respective brand interactions of the prior selected reward offers. In an additional example, the reward offer evaluator 830 may determine respective categories of the prior selected reward offers. Additionally, the reward offer evaluator 830 may determine respective categories of the prior selected reward offers. In some examples, the reward offer evaluator 830 may determine an aggregate reward comprising one or more rewards associated with a user account of the passenger. In other examples, the reward offer evaluator 830 may determine an unused portion of the determined aggregate reward.

The reward offer evaluator 830 may receive one or more respective bids associated with the plurality of reward offers. In some examples, the reward offer evaluator 830 may provide a modified subset of the plurality of reward offers to the passenger.

The output module 835 may manage output signals for the apparatus 805. For example, the output module 835 may receive signals from other components of the apparatus 805 and may transmit these signals to other components or devices. In some specific examples, the output module 835 may transmit output signals for display in a user interface, for storage in a database or data store, for further processing at a server or server cluster, or for any other processes at any number of devices or systems. In some cases, the output module 835 may be a component of an I/O controller 915 as described with reference to FIG. 9.

Figure 9:
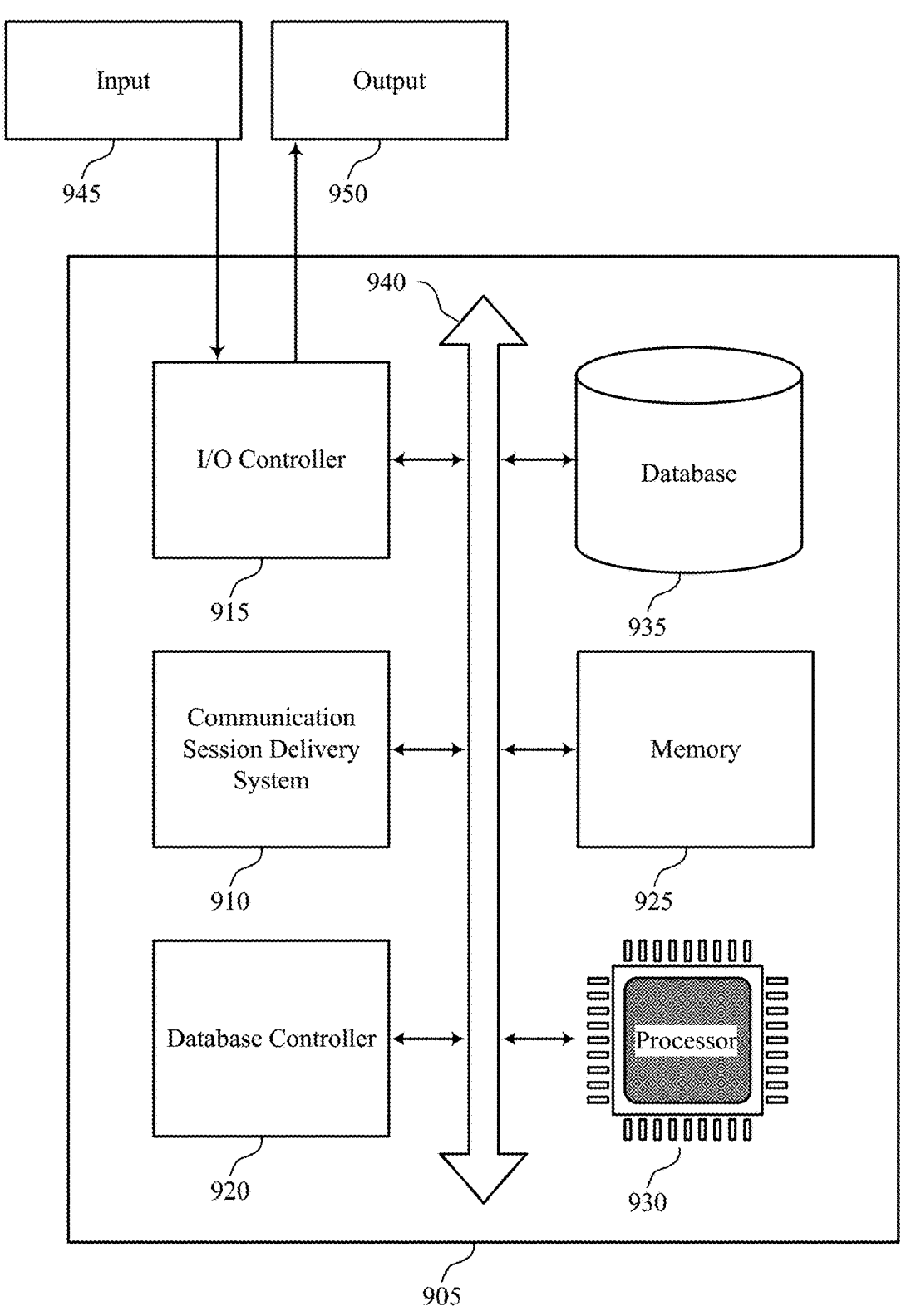

FIG. 9 shows a diagram of a system 900 including a device 905 that supports techniques for providing in-flight communication sessions in accordance with aspects of the present disclosure. The device 905 may be an example of or include the components of a communication session delivery system or an apparatus 805 as described herein. The device 905 may include components for bi-directional data communications including components for transmitting and receiving communications, including a communication session delivery system 910, an I/O controller 915, a database controller 920, memory 925, a processor 930, and a database 935. These components may be in electronic communication via one or more buses (e.g., bus 940).

The communication session delivery system 910 may be an example of a communication session delivery system 125 as described herein. In some cases, the communication session delivery system 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions.

FIG. 10 shows a flowchart illustrating a method 1000 that supports techniques for providing in-flight communication sessions in accordance with aspects of the present disclosure. The operations of method 1000 may be implemented by a communication session delivery system or its components as described herein. For example, the operations of method 1000 may be performed by a communication session delivery system as described with reference to FIGS. 1 through 9. In some examples, a communication session delivery system may execute a set of instructions to control the functional elements of the communication session delivery system to perform the functions described herein. Additionally or alternatively, a communication session delivery system may perform aspects of the functions described herein using special-purpose hardware.

At 1005, the communication session delivery system may receive a plurality of reward offers for eventual presentation to one or more passengers of a travel segment. Each of the plurality of reward offers may be linked to one or more target characteristics that a brand partner may wish to focus its reward offer towards. The communication session delivery system may receive the reward offers from brand partners or from another entity. The operations of 1005 may be performed according to the methods described herein. In some examples, aspects of the operations of 1005 may be performed by a reward offer evaluator as described with reference to FIGS. 8 and 9.

At 1010, the communication session delivery system may identify profile information of one or more passengers and/or of a travel segment. A travel provider may provide the profile information to the communication session delivery system, or the communication session delivery system may retrieve the information from data storage. The profile information may include any information that the travel provider may possess regarding a passenger and characteristics of the travel segment that the passenger is booked for. The operations of 1010 may be performed according to the methods described herein. In some examples, aspects of the operations of 1010 may be performed by an information controller as described with reference to FIGS. 8 and 9.

At 1015, the communication session delivery system may select a subset of the plurality of reward offers for presentation to a passenger of a travel segment. Communication session delivery system may select a subset of reward offers that is tailored to the passenger of the travel segment. Communication session delivery system may choose the subset of reward offers based on the profile information of a particular passenger and/or a characteristic of the particular travel segment. The operations of 1015 may be performed according to the methods described herein. In some examples, aspects of the operations of 1015 may be performed by a reward offer evaluator as described with reference to FIGS. 8 and 9.

At 1020, the communication session delivery system may provide the selected subset of the plurality of reward offers to the passenger. The passenger may view the selected reward offers through a portal on a mobile device either prior or during the travel segment. The passenger may choose one or more reward offers from the selection of reward offers and may then proceed to complete a brand interaction associated with the chosen reward offer. The operations of 1020 may be performed according to the methods described herein. In some examples, aspects of the operations of 1020 may be performed by a communication interface as described with reference to FIGS. 8 and 9.

At 1025, the communication session delivery system may determine that the passenger has completed a brand interaction associated with a reward offer. The passenger may complete a brand interaction in direct communication with a brand partner, and upon completion of the brand interaction, the brand partner may indicate to the communication session delivery system to provide communication session access to the passenger. In another example, when the passenger selects a reward offer, the passenger's mobile device may transmit an indication of the selected reward offer to the communication session delivery system. The communication session delivery system may then forward session information associated with the passenger-selected reward offer to the brand partner. The brand partner may monitor various brand interactions and then verify when a brand interaction associated with the session information has occurred. Upon the verification, the brand partner may indicate to the communication session delivery system that the brand interaction associated with the session information has occurred. The operations of 1025 may be performed according to the methods described herein. In some examples, aspects of the operations of 1025 may be performed by a brand interaction controller as described with reference to FIGS. 8 and 9.

At 1030, upon verification of the passenger completing a brand interaction, the communication session delivery system may establish a communication session for the passenger on a mobile vessel with a network access unit during the passenger's travel segment. The communication session will be of the type of session and for a specified duration as described in the selected reward offer. In some examples, the passenger may have an account that the passenger may link several completed brand interactions to, and the communication session delivery system may aggregate values of the respective rewards of each of the verified brand interactions that the passenger may use during a travel segment. The operations of 1030 may be performed according to the methods described herein. In some examples, aspects of the operations of 1030 may be performed by a communication interface as described with reference to FIGS. 8 and 9.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." Also, as used herein, including in the claims, a "subset" refers to one or more of a set of items. The subset may be, for example, one item of the set up to and including each item of the set.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, performed by a communication session delivery system on a transport vessel served via a wireless communications link, for providing network access service for at least a portion of a travel segment of the transport vessel, the method comprising:

electronically receiving, at the communication session delivery system, a plurality of reward offers from one or more partner devices external to the transport vessel via one or more communications links comprising the wireless communications link, each reward offer of the plurality of reward offers associating a respective reward with a respective passenger action;

storing the plurality of reward offers in a data store of the communication session delivery system;

translating the plurality of reward offers into corresponding communication experiences for visual presentation to a set of passengers of the transport vessel;

obtaining profile information of each passenger of the set of passengers of the transport vessel for the travel segment from at least one of: (1) a personal device of a respective passenger, (2) a travel provider data store, or (3) the one or more partner devices, the profile information comprising one or more user characteristics for each passenger of the set of passengers;

generating a pool of reward offers from the plurality of reward offers based at least in part on applying an artificial limitation upon the plurality of reward offers, wherein the artificial limitation is determined based at least in part on a scarcity factor, user characteristics from the profile information, characteristics of the travel segment, corresponding values associated with the plurality of reward offers, or a combination thereof;

generating an interactive visual user interface for viewing by one or more passengers of the set of passengers, wherein the interactive visual user interface is configured to identify (1) a selected group of reward offers available for selection by the one or more passengers and (2) a translated communication experience corresponding to each reward offer of the selected group of reward offers;

providing the interactive visual user interface to a passenger device for display to a passenger;

receiving, from the passenger device, a selection by the passenger of a reward offer from the selected group of reward offers displayed on the interactive visual user interface;

receiving, from the one or more partner devices, an indication of completion by the passenger of a passenger action associated with the reward offer; and establishing a communication session over the wireless communications link for the personal device associated with the passenger via a multi-user access terminal on the transport vessel based at least in part on the completion of the passenger action of the reward offer, wherein a characteristic of the communication session is based at least in part on the respective reward of the reward offer.

2. The method of claim 1, wherein the artificial limitation is determined based at least in part on a predetermined quantity of rewards on the travel segment, a predetermined amount of time corresponding to the respective rewards, or a combination thereof.

3. The method of claim 1, further comprising:

presenting a metric related to the artificial limitation to the passenger with the pool of reward offers.

4. The method of claim 1, further comprising:

determining a quantity of reward offers for the pool of reward offers based at least in part on a predetermined value, a quantity of the set of passengers, a duration of the travel segment, a threshold quantity for the set of passengers for the travel segment, or any combination thereof.

5. The method of claim 1, further comprising:

receiving, from the one or more partner devices, indications of completion of respective passenger actions associated with one or more reward offers of the plurality of reward offers by the one or more passengers for the travel segment;

electronically receiving, at the communication session delivery system, a second plurality of reward offers from one or more second partner devices, each reward offer of the second plurality of reward offers associating a respective second reward with a respective second passenger action;

obtaining second profile information of each passenger of a second set of passengers a second transport vessel for a second travel segment from at least one of: (1) a second personal device of a respective passenger, (2) a second travel provider data store, or (3) the one or more second partner devices, the second profile information comprising one or more second user characteristics for each passenger of the second set of passengers; and selecting a second subset of the second plurality of reward offers for a second passenger from the second set of passengers based at least in part on the indications of completion of the respective passenger actions associated with the one or more reward offers of the plurality of reward offers.

6. The method of claim 1, further comprising:

determining completions of respective passenger actions of prior selected reward offers by the one or more passengers, wherein generating the pool of reward offers is based at least in part on the completions of the respective passenger actions of the prior selected reward offers.

7. The method of claim 6, wherein the plurality of reward offers are each associated with a category of a plurality of categories, the method further comprising:

determining respective categories of the prior selected reward offers, wherein generating the pool of reward offers:

is based at least in part on the respective categories of the prior selected reward offers; or comprises excluding reward offers of the plurality of reward offers based at least in part on the respective categories of the excluded reward offers and the respective categories of the prior selected reward offers; or both.

8. The method of claim 1, further comprising:

determining interaction history data associated with the plurality of reward offers, wherein generating the pool of reward offers is based at least in part on the interaction history data.

9. The method of claim 1, wherein:

the characteristics of the travel segment comprise an origin of the travel segment, a destination of the travel segment, respective passenger classes for the set of passengers, a duration of the travel segment, a type of vessel for the travel segment, or a combination thereof; and the characteristic of the communication session comprises a total amount of time allotted to the communication session, a data rate of the communication session, a total amount of data communicated for the communication session, access to one or more service types, access to one or more network destinations, or a combination thereof.

10. The method of claim 1, further comprising:

receiving, from the passenger device, a request for a modification of the pool of reward offers; and providing a modified pool of reward offers to the passenger, wherein the modified pool of reward offers comprises the reward offer.

11. A communication session delivery system for providing network access service for at least a portion of a travel segment of a transport vessel via a wireless communications link, comprising processing circuitry configured to implement:

a reward offer evaluator configured to:

electronically receive, at the communication session delivery system, a plurality of reward offers from one or more partner devices external to the transport vessel via one or more communications links comprising the wireless communications link, each reward offer of the plurality of reward offers associating a respective reward with a respective passenger action;

store the plurality of reward offers in a data store of the communication session delivery system; and translate the plurality of reward offers into corresponding communication experiences for visual presentation to a set of passengers of the transport vessel;

an information controller configured to obtain profile information of each passenger of the set of passengers of the transport vessel for the travel segment from at least one of: (1) a personal device of a respective passenger, (2) a travel provider data store, or (3) the one or more partner devices, the profile information comprising one or more user characteristics for each passenger of the set of passengers;

the reward offer evaluator further configured to generate a pool of reward offers from the plurality of reward offers based at least in part on applying an artificial limitation upon the plurality of reward offers, wherein the artificial limitation is determined based at least in part on a scarcity factor, user characteristics from the profile information, characteristics of the travel segment, corresponding values associated with the plurality of reward offers, or a combination thereof;

a communication interface configured to:

generate an interactive visual user interface for viewing by one or more passengers of the set of passengers, wherein the interactive visual user interface is configured to identify (1) a selected group of reward offers available for selection by the one or more passengers and (2) a translated communication experience corresponding to each reward offer of the selected group of reward offers;

provide the interactive visual user interface to a passenger device for display to a passenger; and receive, from the passenger device, a selection by the passenger of a reward offer from the selected group of reward offers displayed on the interactive visual user interface;

a partner interaction controller configured to receive, from the one or more partner devices, an indication of completion by the passenger of a passenger action associated with the reward offer; and the communication interface further configured to establish a communication session over the wireless communications link for the personal device associated with the passenger via a multi-user access terminal on the transport vessel based at least in part on the completion of the passenger action of the reward offer, wherein a characteristic of the communication session 1s based at least in part on the respective reward of the reward offer.

12. The communication session delivery system of claim 11, wherein the artificial limitation is determined based at least in part on a predetermined quantity of rewards on the travel segment, a predetermined amount of time corresponding to the respective rewards, or a combination thereof.

13. The communication session delivery system of claim 11, wherein the communication interface is further configured to:

present a metric related to the artificial limitation to the passenger with the pool of reward offers.

14. The communication session delivery system of claim 11, wherein the reward offer evaluator is further configured to:

determine a quantity of reward offers for the pool of reward offers based at least in part on a predetermined value, a quantity of the set of passengers, a duration of the travel segment, a threshold quantity for the set of passengers for the travel segment, or any combination thereof.

15. The communication session delivery system of claim 11, wherein:

the partner interaction controller is further configured to receive, from the one or more partner devices, indications of completion of respective passenger actions associated with one or more reward offers of the plurality of reward offers by one or more passengers of the set of passengers for the travel segment;

the reward offer evaluator is further configured to electronically receive, at the communication session delivery system, a second plurality of reward offers from one or more second partner devices, each reward offer of the second plurality of reward offers associating a respective second reward with a respective second passenger action;

the information controller is further configured to obtain second profile information of each passenger of a second set of passengers a second transport vessel for a second travel segment from at least one of: (1) a second personal device of a respective passenger, (2) a second travel provider data store, or (3) the one or more second partner devices, the second profile information comprising one or more second user characteristics for each passenger of the second set of passengers; and the reward offer evaluator is further configured to select a second subset of the second plurality of reward offers for a second passenger from the second set of passengers based at least in part on the indications of completion of the respective passenger actions associated with the one or more reward offers of the plurality of reward offers.

16. The communication session delivery system of claim 11, wherein the partner interaction controller is further configured to:

determine completions of respective passenger actions of prior selected reward offers by the passenger, wherein the pool of reward offers is generated based at least in part on the completions of the respective passenger actions of the prior selected reward offers.

17. The communication session delivery system of claim 16, wherein the plurality of reward offers are each associated with a category of a plurality of categories, and wherein the reward offer evaluator is further configured to:

determine respective categories of the prior selected reward offers, wherein the pool of reward offers is generated:

based at least in part on the respective categories of the prior selected reward offers; or to exclude reward offers of the plurality of reward offers based at least in part on the respective categories of the excluded reward offers and the respective categories of the prior selected reward offers; or both.

18. The communication session delivery system of claim 11, wherein the information controller is further configured to:

determine interaction history data associated with the plurality of reward offers, wherein the pool of reward offers is generated based at least in part on the interaction history data.

19. The communication session delivery system of claim 11, wherein:

the characteristics of the travel segment comprise an origin of the travel segment, a destination of the travel segment, respective passenger classes for the set of passengers, a duration of the travel segment, a type of vessel for the travel segment, or a combination thereof; and the characteristic of the communication session comprises a total amount of time allotted to the communication session, a data rate of the communication session, a total amount of data communicated for the communication session, access to one or more service types, access to one or more network destinations, or a combination thereof.

20. The communication session delivery system of claim 17, wherein:

the communication interface is further configured to receive, from the passenger device, a request for a modification of the pool of reward offers; and the reward offer evaluator is further configured to provide a modified pool of reward offers to the passenger, wherein the modified pool of reward offers comprises the reward offer.

* * * * *